(12) United States Patent
Krull et al.

(10) Patent No.: US 12,589,347 B2
(45) Date of Patent: Mar. 31, 2026

(54) SURFACE COATED FILTER AND METHOD

(71) Applicant: Baldwin Filters, Inc., Cleveland, OH (US)

(72) Inventors: Timothy L. Krull, Kearney, NE (US); Matthew K. Epperson, Kearney, NE (US); Daniel P. Pokorney, Kearney, NE (US); Michael J. Von Seggern, Kearney, NE (US)

(73) Assignee: Baldwin Filters, Inc., Cleveland, OH (US)

( * ) Notice: Subject to any disclaimer, the term of this patent is extended or adjusted under 35 U.S.C. 154(b) by 0 days.

(21) Appl. No.: 18/432,276

(22) Filed: Feb. 5, 2024

(65) Prior Publication Data

US 2024/0173662 A1    May 30, 2024

Related U.S. Application Data

(63) Continuation of application No. 18/153,034, filed on Jan. 11, 2023, now Pat. No. 11,925,892, which is a (Continued)

(51) Int. Cl.
B01D 46/52 (2006.01)
B01D 46/00 (2022.01)
(Continued)

(52) U.S. Cl.
CPC ....... B01D 46/525 (2013.01); B01D 46/0002 (2013.01); B01D 46/52 (2013.01);
(Continued)

(58) Field of Classification Search
CPC .. B01D 46/525; B01D 46/0002; B01D 46/52; B01D 46/88; B01D 25/001; B01D 46/0004
See application file for complete search history.

(56) References Cited

U.S. PATENT DOCUMENTS

| | | | |
|---|---|---|---|
| 3,039,908 A | 6/1962 | Parmele | |
| 3,078,650 A | 2/1963 | Anderson et al. | |

(Continued)

FOREIGN PATENT DOCUMENTS

| | | |
|---|---|---|
| CA | 2331822 A1 | 11/1999 |
| EP | 0 393 374 B1 | 6/1994 |

(Continued)

OTHER PUBLICATIONS

U.S. Appl. No. 62/243,740, filed Oct. 20, 2015, Tate et al.

(Continued)

*Primary Examiner* — Jennifer Dieterle
*Assistant Examiner* — Phillip Y Shao
(74) *Attorney, Agent, or Firm* — Reinhart Boerner Van Deuren P.C.

(57) ABSTRACT

A filter element is provided. The filter element includes a filter media pack including an outer surface. The outer surface extending between a first flow face and a second flow face. The filter element also includes a polymeric coating applied to the outer surface of the filter media pack, wherein the polymeric coating is not a molded structure. In embodiments, the polymeric coating covers at least 25% of a span between the first flow face and the second flow face and has an average thickness of between 0.005 and 0.100 in. In other embodiments, the polymeric coating has a surface roughness of at least 50 μin to provide an outer gripping surface. A method and system for applying the polymeric coating to the filter element are also provided.

26 Claims, 24 Drawing Sheets

Related U.S. Application Data continuation of application No. 15/999,284, filed as application No. PCT/US2017/017202 on Feb. 9, 2017, now Pat. No. 11,583,796.

(60) Provisional application No. 62/297,569, filed on Feb. 19, 2016.

(51) Int. Cl.
    B01D 46/88     (2022.01)
    B01D 25/00     (2006.01)

(52) U.S. Cl.
    CPC ............ B01D 46/88 (2022.01); *B01D 25/001* (2013.01); *B01D 46/0004* (2013.01)

(56) References Cited

U.S. PATENT DOCUMENTS

| | | | |
|---|---|---|---|
| 3,133,847 A | 5/1964 | Millington | |
| 3,972,694 A | 8/1976 | Head | |
| 4,159,197 A | 6/1979 | Schuler et al. | |
| 4,162,982 A | 7/1979 | Chesner | |
| 4,373,635 A | 2/1983 | Mules | |
| 4,410,427 A | 10/1983 | Wydeven | |
| 4,720,292 A | 1/1988 | Engel et al. | |
| 4,758,460 A | 7/1988 | Spicer et al. | |
| 4,925,561 A | 5/1990 | Ishii et al. | |
| 4,963,171 A | 10/1990 | Osendorf | |
| 5,783,313 A | 7/1998 | Moysan, III et al. | |
| 5,792,247 A | 8/1998 | Gillingham et al. | |
| 5,800,581 A | 9/1998 | Gielink et al. | |
| 5,820,644 A | 10/1998 | Mori et al. | |
| 5,820,645 A | 10/1998 | Murphy, Jr. | |
| 5,820,646 A | 10/1998 | Gillingham et al. | |
| 6,080,310 A | 6/2000 | Bolser et al. | |
| 6,171,684 B1 | 1/2001 | Kahlbaugh et al. | |
| 6,190,432 B1 * | 2/2001 | Gieseke | B01D 46/527 |
| | | | 55/498 |
| 6,197,708 B1 | 3/2001 | Yoshida et al. | |
| 6,280,824 B1 | 8/2001 | Insley et al. | |
| 6,348,084 B1 | 2/2002 | Gieseke et al. | |
| 6,447,567 B1 | 9/2002 | Ehrenberg | |
| 6,568,540 B1 | 5/2003 | Holzmann et al. | |
| 6,743,317 B2 | 6/2004 | Wydeven | |
| 6,858,260 B2 | 2/2005 | Taylor et al. | |
| 6,966,940 B2 | 11/2005 | Krisko et al. | |
| 7,396,376 B2 | 7/2008 | Schrage et al. | |
| 7,708,796 B2 | 5/2010 | Rieger et al. | |
| 7,967,886 B2 | 6/2011 | Schrage et al. | |
| 8,034,144 B2 | 10/2011 | Gieseke et al. | |
| 8,177,877 B2 | 5/2012 | Merritt et al. | |
| 8,206,483 B2 | 6/2012 | Rieger | |
| 8,241,383 B2 | 8/2012 | Schrage et al. | |
| 8,518,141 B2 | 8/2013 | Schrage et al. | |
| 8,795,404 B2 | 8/2014 | Lange | |
| 9,114,346 B2 | 8/2015 | Schrage et al. | |
| RE46,700 E | 2/2018 | Schrage et al. | |
| 11,583,796 B2 | 2/2023 | Krull et al. | |
| 11,925,892 B2 | 3/2024 | Krull et al. | |
| 2002/0073667 A1 | 6/2002 | Barris et al. | |
| 2002/0185007 A1 | 12/2002 | Xu et al. | |
| 2003/0217534 A1 | 11/2003 | Krisko et al. | |
| 2006/0286006 A1 * | 12/2006 | McDaniel | C02F 3/342 |
| | | | 366/241 |
| 2007/0039296 A1 | 2/2007 | Schrage et al. | |
| 2008/0160318 A1 * | 7/2008 | Senkfor | C08G 18/765 |
| | | | 428/423.1 |
| 2008/0250766 A1 * | 10/2008 | Schrage | B01D 46/527 |
| | | | 55/498 |
| 2009/0320423 A1 | 12/2009 | Merritt et al. | |
| 2009/0320424 A1 | 12/2009 | Merritt et al. | |
| 2010/0000411 A1 | 1/2010 | Wertz et al. | |
| 2010/0147760 A1 | 6/2010 | Leavitt et al. | |
| 2010/0192530 A1 | 8/2010 | Wydeven et al. | |
| 2012/0304602 A1 | 12/2012 | Healey et al. | |
| 2013/0001154 A1 | 1/2013 | Chung et al. | |
| 2013/0001155 A1 | 1/2013 | Neubauer et al. | |
| 2014/0217009 A1 | 8/2014 | Osterfeld | |
| 2015/0231547 A1 | 8/2015 | Schrage et al. | |
| 2015/0258660 A1 * | 9/2015 | Wasilczyk | B24D 3/28 |
| | | | 528/68 |
| 2016/0296866 A1 * | 10/2016 | Badyal | C09D 125/08 |
| 2018/0169555 A1 | 6/2018 | Von Seffern et al. | |
| 2018/0318745 A1 | 11/2018 | Nichols et al. | |

FOREIGN PATENT DOCUMENTS

| | | |
|---|---|---|
| EP | 1 247 558 A1 | 10/2002 |
| EP | 2 140 923 A2 | 6/2010 |
| EP | 1 254 689 B1 | 9/2010 |
| GB | 1 535 789 | 12/1978 |
| JP | S60-155921 U | 10/1985 |
| JP | S63-33612 Y2 | 9/1988 |
| JP | 2010-12461 A | 1/2010 |
| JP | 2013-202531 A | 10/2013 |
| WO | WO 91/19898 A1 | 12/1991 |
| WO | WO 96/08303 A1 | 3/1996 |
| WO | WO 98/52672 A1 | 11/1998 |
| WO | WO 03/084641 A2 | 10/2003 |
| WO | WO 2006/017790 A1 | 2/2006 |
| WO | WO 2007/056589 A2 | 5/2007 |
| WO | WO 2009/039285 A1 | 3/2009 |
| WO | WO 2016/057815 A1 | 4/2016 |

OTHER PUBLICATIONS

European Patent Office; Information about the result of oral proceedings; Dec. 8, 2022; 2 pages.
European Patent Office; Decision of the Opposition Division and instruction; Feb. 6, 2023; 9 pages.
European Patent Office; Annex to the opposition; Minutes of the oral proceedings—conclusion of the proceedings; Provision of the minutes; Feb. 15, 2023; 18 pages.
European Patent Office; Decision of the Opposition Division and instruction; Feb. 16, 2023; 44 pages.
Donaldson Company, Inc.; Notice of Appeal; Apr. 25, 2023; 1 page.
Donaldson Company, Inc.; Statement of grounds of appeal; Letter accompanying subsequently filed items; Jun. 19, 2023; 14 pages.
Baldwin Filters, Inc.; Reply to Appeal; Sep. 8, 2023; 50 pages.
Baldwin Filters, Inc.; Petition for Inter Partes Review of U.S. Pat. No. Re. 46,700; May 25, 2018; 77 pages.
Baldwin Filters, Inc.; Petition for Inter Partes Review of U.S. Pat. No. Re. 46,700, Declaration of Steve Merritt; 59 pages.
Baldwin Filters, Inc.; Decision Institution of Inter Partes Review 35 U.S.C.§ 314; Inter Partes Review of U.S. Pat. No. Re. 46,700; Dec. 4, 2018; 40 pages.
Baldwin Filters, Inc.; Scheduling Order; Inter Partes Review of U.S. Pat. No. Re. 46,700, Dec. 4, 2018; 40 pages.
Baldwin Filters, Inc.; Baldwin Request for Rehearing on Institution Decision; Inter Partes Review of U.S. Pat. No. Re. 46,700; Dec. 17, 2018; 16 pages.
Baldwin Filters, Inc.; Written Submissions; European Patent Office; Oct. 6, 2022; 63 pages.
Baldwin Filters, Inc.; Submissions of Patentee in Response to Notice of Opposition; European Patent Office; Dec. 13, 2021; 64 pages.
Donaldson Company Inc.; Submission in Oppositions Processions; European Patent Office; Oct. 5, 2022; 10 pages.
European Patent Office.; Summons to Attend Oral Proceedings; European Patent Office; Apr. 5, 2022; 43 pages.
European Patent Office; Notice of Opposition by Donaldson Company, Inc.; Aug. 8, 2021; 35 pages.
European Patent Office, *Decision of the Board of Appeal*, Mar. 13, 2025.
European Patent Office, *Minutes of Oral Proceedings (and Amended Claims)*, Feb. 11, 2025.
Donaldson Company, *Written Submissions in Preparation for Oral Proceedings* Jan. 9, 2025.

(56)        References Cited

OTHER PUBLICATIONS

Baldwin Filters, Inc. *Reply to Preliminary Opinion of Board & Auxiliary Requests*, Oct. 30, 2024.
European Patent Office, *Communication of the Board of Appeal (Preliminary Opinion)*, Sep. 23, 2024.
European Patent Office; Summons to Attend Oral Proceedings; European Patent Office; Nov. 3, 2025; 8 pages.

\* cited by examiner

SURFACE COATED FILTER AND METHOD

CROSS-REFERENCE TO RELATED PATENT APPLICATIONS

This patent application is a continuation of co-pending U.S. patent application Ser. No. 18/153,034, filed Jan. 11, 2023, which is now pending, which is a continuation of co-pending U.S. patent application Ser. No. 15/999,284, filed Aug. 17, 2018, which issued on Feb. 21, 2023, as U.S. Pat. No. 11,583,796, which is a nationalization of U.S. PCT Application No. PCT/US2017/017202, filed Feb. 9, 2017, and claims the benefit of U.S. Provisional Patent Application No. 62/297,569, filed Feb. 19, 2016; the entire teachings and disclosure of each of these patent applications are incorporated herein by reference thereto.

FIELD OF THE INVENTION

This invention generally relates to filters, and more particularly, to a coating of the exterior surface of a filter media pack.

BACKGROUND OF THE INVENTION

Filter media packs are often wrapped with a fabric or paper to enhance the aesthetics of the block of filter media as well as to protect the filter media during handling. Conventionally, the paper wraps are heavy cardstock, and the fabric wraps are polyester non-wovens. These wraps provide some reinforcement for the filter media packs, but they do not protect the filter media from puncturing if dropped or gouged during handling or installation. Additionally, these wraps do not provide strong bonding surfaces for attaching structures, such as seal members or mounting frames, which allows the attached structures to easily tear off. Further, these wraps are often difficult to bind to the filter media, which creates leak paths around the filter media pack.

In some instances, the filter media is not coated or covered as discussed in U.S. Pat. No. 7,396,376 to Schrage et al. However, outer skins or protective layers are also proposed as evidenced by U.S. Pat. Nos. 4,410,427 and 6,743,317, both to Wydeven, U.S. Pat. No. 5,820,646 to Gillingham et al, and Japanese Utility Model S60-155921 to Tuchyiya Seisakusho Limited. Additionally, molding techniques for such layers are proposed in U.S. Pat. No. 7,967,886 to Schrage et al., but this proposal requires substantial space and complex, expensive molding tooling and operation. Other slip resistant and textured surface layers have been proposed, including U.S. Publication No. 2014/0217009 by Osterfeld and U.S. Pat. No. 6,080,310 to Bolser et al.

Various improvements in the durability, handling, and leak prevention of filter media packs not previously realized in the art can be realized with different aspects or embodiments of the present invention as presented below, thus demonstrating such shortcomings in the state of the art.

BRIEF SUMMARY OF THE INVENTION

The inventive aspects and embodiments discussed below in the following separate paragraphs of the summary may be used independently or in combination with each other.

In one aspect, embodiments of a filter element are provided. The filter element includes a filter media pack having an outer surface. The outer surface extends between a first flow face and a second flow face. A polymeric coating is applied to the outer surface of the filter media pack, and the polymeric coating is not a molded structure.

Another aspect is directed to a polymeric coating can have a surface roughness of at least 50 μin. In preferred embodiments, the surface roughness is between about 100 and about 10,000 μin.

The polymeric coating preferably penetrates the filter media pack to a depth of at least 9,000 μin.

In preferred embodiments, the polymeric coating can be a spray coating layer. Spraying has several advantages.

In other embodiments, the polymeric coating can be a roll coating layer.

In order to enhance protection of the filter element during handling, the polymeric coating preferably has a Shore A Durometer hardness of between about 60 and about 95. Thus, the polymeric coating is harder than conventional non-woven or paper wraps that are easily punctured or crushed if mishandled.

The polymeric coating can include more than one layer, such as at least two layers. Preferably, at least one layer is polyurea.

In various embodiments, the polymeric coating is selected from the group consisting of urethane, acrylic, epoxy, silicone, polyurethane, polyurea, polyaspartic, aliphatic polyurea, polystyrene, polyethylene, ethylene-vinyl acetate, polyethylene-vinyl acetate, ethylene propylene diene monomer, polyurea/polyurethane hybrid, and combinations thereof. Additionally, the polymeric coating can optionally include fiberglass, roughening agents or other fillers.

The polymeric coating can be applied to a variety of filter element types. In one embodiment, the filter media pack is constructed of a filter media that includes a fluted filter media filter pack having a face sheet and a fluted sheet in a wound or stacked configuration. Unfiltered fluid passes through the face sheet or the fluted sheet to pass from the first flow face to the second flow face. In preferred embodiments, a span from the first flow face to the second flow face is at least 8 centimeters.

Additionally, the fluted filter media filter pack can be a wound pack having an annular shape. A leading edge of the wound pack is located at a center of the pack, and a trailing edge of the wound pack terminates along the outer surface, forming a step on the outer surface. The polymeric coating fills in and seals the step, preventing unfiltered fluid flow leakage from the first flow face to the second flow face. Preferably, no additional materials are applied along the step between the polymeric coating and the fluted filter media filter pack.

In another embodiment, the filter element is a pleated filter element constructed of a filter media having a plurality of pleat flanks extending between pleat tips at the first flow face and pleat tips at the second flow face. The filter element is configures in such a way that unfiltered fluid must pass through the filter media to pass from the first flow face to the second flow face. The polymeric coating is applied to a leading-most pleat flank and a trailing-most pleat flank and, optionally, along edges of the pleat flanks that extend transverse to the leading-most pleat flank and the trailing-most pleat flank.

In order to provide maximum air throughput, preferably, the filter media pack first flow face and a second flow face are free of the polymeric coating.

The polymeric coating of the filter element can cover various amounts of the outer surface of the filter media pack. Preferably, the polymeric coating has been applied to at least 25% of a surface area of the outer surface between the first flow face and the second flow face.

One advantage of the polymeric coating is that it helps to ensure that the filter element maintains its dimensions during storage. Accordingly, in an embodiment, the filter media pack maintains its volume during a storage period after the polymeric coating has been applied such that the polymeric coating restrains the media pack from expanding and limits any expansion in perimeter of the outer surface to less than 5%, when subjected to 100% humidity for a period of 48 hours.

To further enhance the dimension stabilizing capabilities of the polymeric coating, the polymeric coating is preferably impermeable to air and moisture.

In certain embodiments, the filter element also includes a border gasket having a housing sealing surface. The border gasket is secured to the polymeric coating in surrounding relation to the filter media pack.

Moreover, the border gasket can be molded in place and integrally bonded to the polymeric coating through a seal material of the border gasket.

In such cases, preferably, the seal material is of a compatible bonding material to the polymeric coating. In embodiments, the seal material can be at least one of polyurethane, urethane, and silicone.

As mentioned above, the polymeric coating can be used with a variety of filter element types. Generally, the filter element will include a filter media pack comprises a filter media having the following properties: a basis weight of between 2 and 4 ounces/square yard; an air permeability of between 5 and 20 cfm (cubic feet per minute) @ 0.5 inch of water gauge pressure, measured according to ASTM F778-88 (2014); and a Mullens burst strength of at least 15 PSI.

Additionally, the filter element may include a filter media pack with filter media having an air filtration initial efficiency of at least 99.6% at removing ISO 12103-1 A2 Fine Test Dust, measured according to ISO 5011. Further, the filter media preferably includes a layer containing at least one of cellulose, polymer, or glass fibers having an average diameter of between 1 and 200 micron.

In certain embodiments, the filter media of the filter media pack forms the outer surface of the filter media pack such that the filter media is in contact with the polymeric coating.

In order to provide incinerability, the filter element can be free of metal or plastic preformed component parts.

In other embodiments, however, the polymeric coating provides a complete surrounding seal between the filter media pack and at least one of a housing gasket or a metal or plastic preformed component part.

Further, the polymeric coating can overlap an outermost exterior surface of the metal or plastic preformed component part.

Preferably, the polymeric coating has an average thickness of between 0.005 and 0.100 in.

In another aspect, an embodiment of a filter element having an enhanced gripping surface is provided. The filter element includes a filter media pack having an outer surface. The outer surface extends between a first flow face and a second flow face. A layer is applied to the outer surface and in surrounding relation of a filtering region of the filter media pack. The layer has a surface roughness of at least 100 μin to provide an outer gripping surface.

In a preferred embodiment, the layer is a polymeric coating of a material that is integrally bonded to and penetrates into the outer surface of the air filter media pack.

In still another aspect, a filter element comprising: a filter media pack including an outer surface, the outer surface extending between a first flow face and a second flow face; and a layer applied to the outer surface of the filter media pack and covering at least 25% of a span between the first flow face and the second flow face, the outer layer having a an average thickness of between 0.005 and 0.100 inches, wherein the layer being a material that is integrally bonded via the material to the outer surface of the air filter media pack.

In still another aspect, a method of applying a liquid coating to a filter element is provided. The first step is providing a filter media pack, and the second step is applying a fluid to an outer periphery of the filter media without molding such that the fluid forms a polymeric coating on the outer periphery.

In an embodiment, the applying step is performed using a sprayer spaced a distance from the filter media pack.

Further, the sprayer can revolve around the media pack while the media pack is stationary.

However, instead, the sprayer can be stationary while the media pack rotates in front of the sprayer.

Additionally, the distance between the sprayer and the media pack can change during the applying step.

In another embodiment, the applying step is performed using a roller.

In certain embodiments, the method of applying a liquid coating to a filter element further includes the step of blocking a first flow face of the filter media pack while applying a polymeric fluid so as to prevent polymeric fluid from being applied to the first flow face.

In such embodiments, it may also be provided that a second flow face, diametrically opposed to the first flow face, is not blocked while applying the polymeric fluid.

However, the sprayer may be angled relative to the filter media pack so as to prevent coating of the second flow face.

Where the filter media pack is a pleated and embossed filter media pack in which a plurality of pleat flanks are each parallel to an axis, the sprayer can be oriented at an angle of between 105° and 150° relative to the axis.

Moreover, the sprayer can also be angled downward with respect to gravity.

In yet another aspect, a system for applying a coating to a filter element is provided. The system includes a pedestal having a base of a first size that is smaller than a bottom surface of a filter media pack. The system also includes a sprayer that is angled downward with respect to and spaced a distance apart from the pedestal. The sprayer is configured to apply a coating to the filter media pack. The system further includes a plate having a second size that is at least the same size as a top surface of the filter media pack.

In an embodiment of the system, the pedestal rotates in front of the sprayer.

In another embodiment of the system, the sprayer revolves around the pedestal.

Moreover, in either embodiment, the distance between the sprayer and the pedestal can vary during application of the coating.

Certain advantages may flow from various aspects discussed above. One potential advantage is the ability of the polymeric coating to stabilize the dimensions of the filter media pack during storage.

Another potential advantage that may be realized through the present invention is that the harness of the polymeric coating improves the puncture and crush resistance of the filter media pack during shipping and/or handling as compared to conventional non-woven and paper wraps.

Still another potential advantage that may be realized through the present invention is the polymeric coating penetrates into the filter media pack and provides a bonding surface for the gasket, which substantially prevents leak paths between the filter media pack and the gasket seal.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figures 1, 2, 3A, 3B:
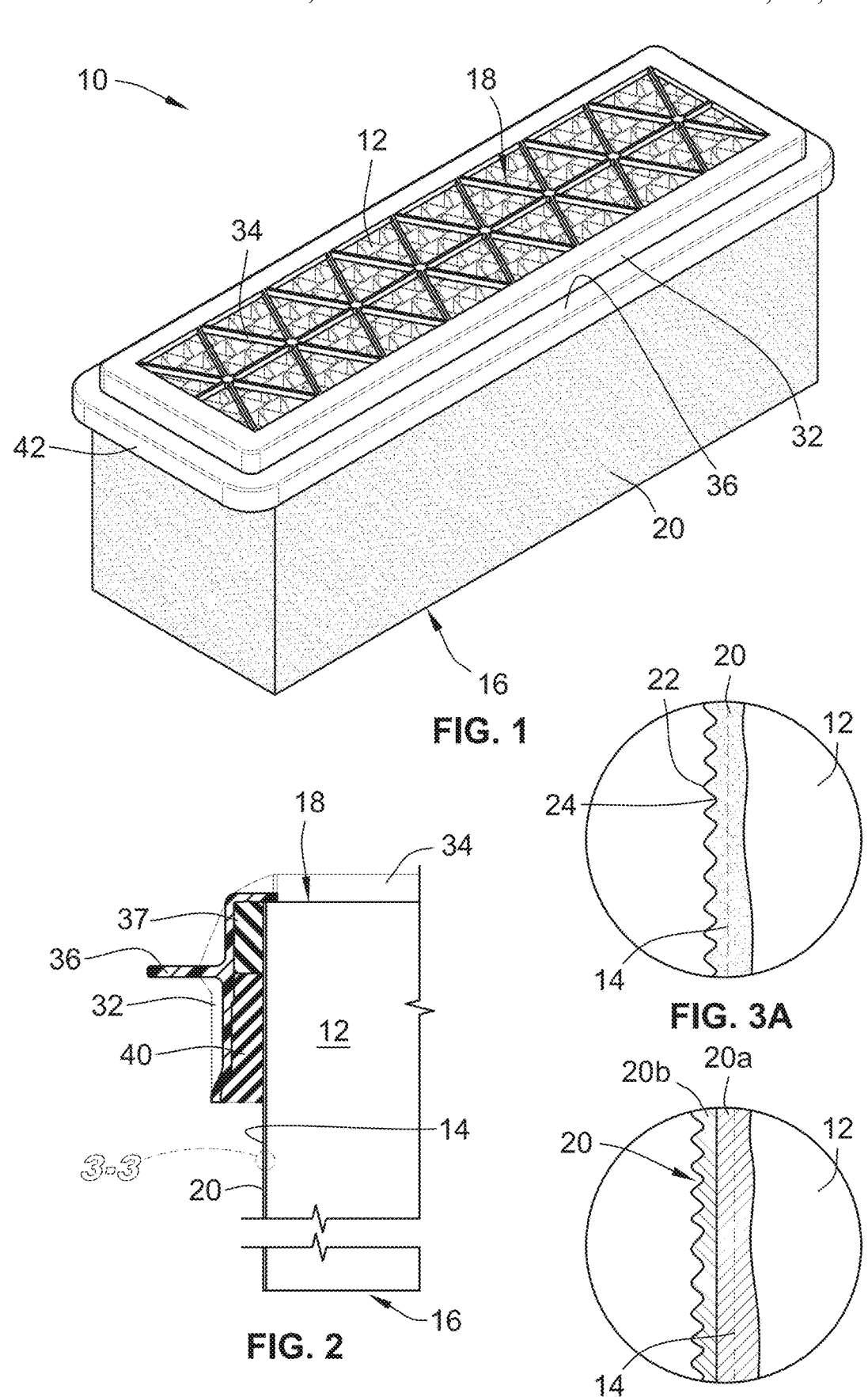
FIG. 1 depicts an isometric view of a filter element having a stacked fluted media according to an exemplary embodiment.
FIG. 2 depicts a partial cross-sectional view of the filter element depicted in FIG. 1.
FIG. 3A depicts a detail view of the polymeric coating as shown in FIG. 2.
FIG. 3B depicts a detail view of an embodiment of the polymeric coating having two layers.

FIG. 1 depicts a filter element 10 according to one embodiment. The filter element 10 includes a filter media pack 12 having an outer surface 14 (shown in FIG. 2). The outer surface 14 extends between a first flow face 16 and a second flow face 18. The outer surface 14 of the media pack 12 is at least partially covered with a polymeric coating 20. Advantageously, the polymeric coating 20 is not a molded structure and, therefore, requires no mold tooling, which can be expensive to make for various sizes and to maintain. Instead, in preferred embodiments the polymeric coating 20 is applied directly to the outer surface 14 of the filter media pack 12 as a liquid, or other flowable/fluid material, that cures or hardens into a solid coating or layer.

The filter media pack 12 includes filter media for removing particulate from a fluid stream. In some instances, the filter media forms the outer surface 14 of the filter media pack 12. Additionally, the filter element 10 can be formed in such a way as to be free of metal or plastic preformed component parts. Filter elements of the variety that do not include metal are generally able to be incinerated. Nevertheless, embodiments of the filter element can include metal or plastic preformed component parts.

Various means can be employed to apply the polymeric coating 20 to the outer surface 14 of the filter media pack 12. For instance, the polymeric coating 20 can be rolled onto the outer surface 14. In a preferred embodiment, the polymeric coating 20 is sprayed onto the outer surface 14.

Figure 4:
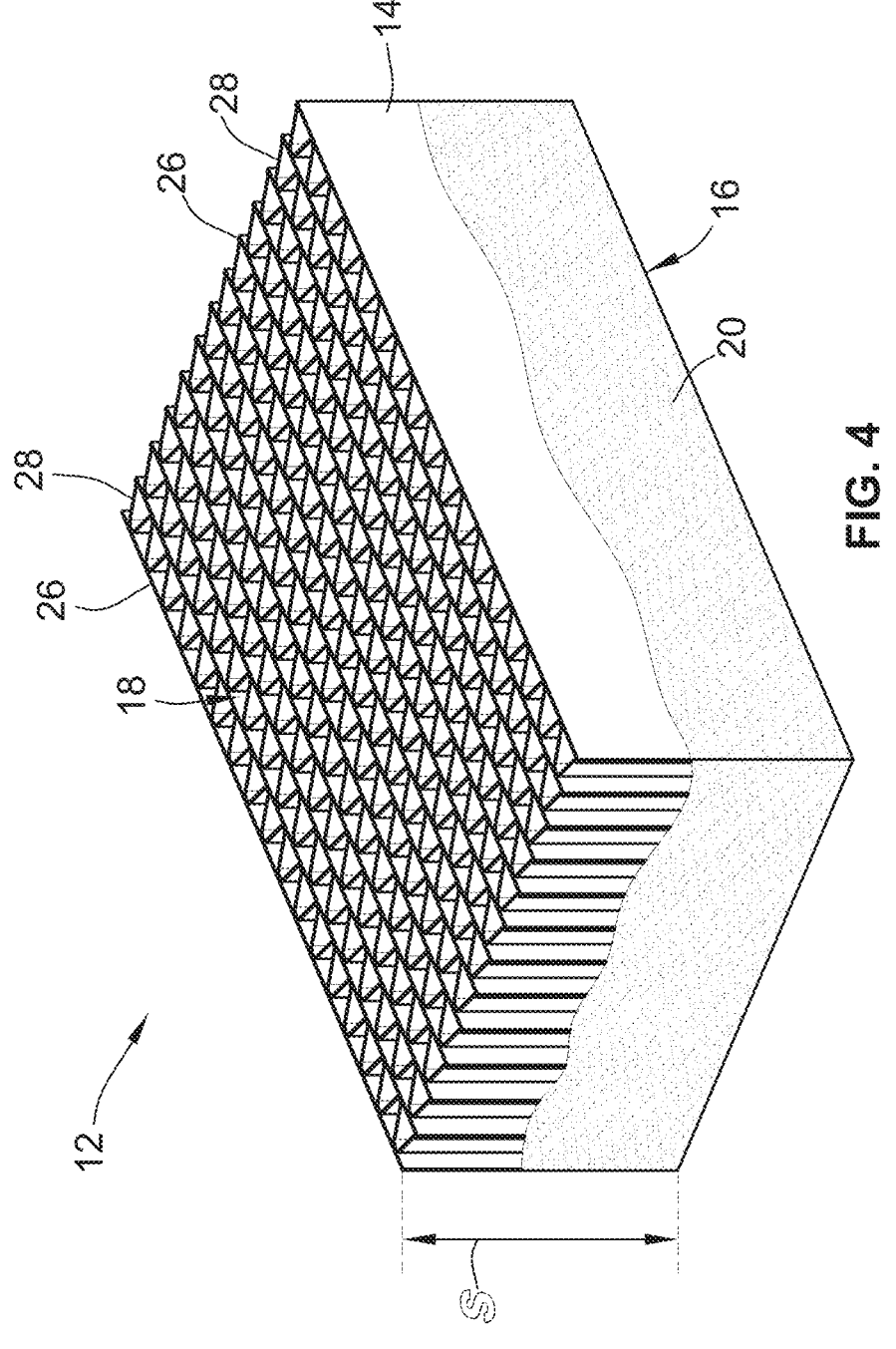
FIG. 4 depicts a stacked filter media pack that can be used in the filter element shown in FIG. 1.

The polymeric coating 20 can cover the entire outer surface 14 or only a portion of the outer surface 14 (see, e.g., FIG. 4). In a preferred embodiment, the polymeric coating 20 is applied to at least 25% of the outer surface 14 extending between the first flow face 16 and the second flow face 18. In a more preferred embodiment, the polymeric coating 20 is applied to at least 50% of the outer surface 14 extending between the first flow face 16 and the second flow face 18. In a most preferred embodiment, the polymeric coating 20 is applied to at least 95% of the outer surface 14 extending between the first flow face 16 and the second flow face 18.

Additionally, in some embodiments, the polymeric coating 20 can extend past the outer surface 14 to cover a portion of the first flow face 16 and/or the second flow face 18. In other embodiments, the first flow face 16 and the second flow face 18 of the filter media pack 12 are free of the polymeric coating 20 to afford maximum fluid flow therethrough.

FIG. 2 illustrates a partial cross-sectional view of the filter embodiment of FIG. 1. As illustrated in FIG. 2, the polymeric coating 20 is relatively thin in relation to the total size of the filter element 10. The polymeric coating 20 has an average thickness of between 0.005 and 0.100 inches. More preferably, the polymeric coating 20 has an average thickness between 0.020 and 0.050 inches, and most preferably, the polymeric coating has an average thickness between 0.030 and 0.045 inches.

Applying the polymeric coating to the filter media pack 12 as a liquid, fluid, or other flowable material allows the polymeric coating 20, in some embodiments, to penetrate the filter media pack 12. Preferably, the polymeric coating 20 penetrates the filter media pack 12 to a depth of 9,000 μin. In this way, the polymeric coating 20 is integrally bonded to the outer surface 14 of the filter media pack 12. This allows the polymeric coating 20 to extend around and interlock with the fibers of the filter media to increase the bond to the filter media pack 12.

In preferred embodiments, the polymeric coating 20 is applied in such a way as to provide a rough surface. The surface roughness improves gripping during handling and also provides an overall more aesthetically pleasing product. FIG. 3A depicts an exaggerated view of the polymeric coating 20 of FIG. 2, which demonstrates the surface roughness in exaggerated form. In a preferred embodiment, the polymeric coating 20 has a surface roughness of at least 50 μin (micro-inches); typically the surface roughness will be less than about 10,000 μin but is not so limited in all embodiments. Surface roughness, as used herein, refers to the average difference between the heights of surface projections 22 compared to surface valleys 24. More preferably, the surface roughness is at least 1,000 μin, and most preferably, the surface roughness is at least 5,000 μin. Further, the surface roughness is more preferably less than 9,000 μin and more preferably less than 7,000 μin.

The polymeric coating 20 advantageously improves the crush strength and burst strength of the filter element so as to avoid damage during shipping and/or handling. In a preferred embodiment, the polymeric coating 20 has Shore A Durometer hardness of between about 60 and about 95. This is significantly harder than conventional filter wraps made of non-woven fabric or paper, which were prone to rip or puncture if dropped or gouged during installation or handling. However, this provides some flexibility in the orthogonal direction. The failure of these conventional wraps as a result of punctures caused damage to the filter media packs and resulted in leak paths around the filter media packs.

Additionally, the polymeric coating 20 enhances the hoop strength of the filter media pack 12 while maintaining the flexibility in the radial direction. Stated another way the polymeric coating 20 is not a rigid, inflexible material that could cause ripping or tearing of the filter media if the filter media pack 12 is contorted during installation and/or handling. Instead, the polymeric coating 20 is capable of flexing with the filter media pack 12 during installation and/or handling while also preventing the filter media pack 12 from expanding outward, such as from moisture absorption or residual processing stresses.

A variety of suitable materials can be utilized as the polymeric coating 20. Such materials include: urethane, acrylic, epoxy, silicone, polyurethane, polyurea, polyaspartic, aliphatic polyurea, polystyrene, polyethylene, ethylene-vinyl acetate, polyethylene-vinyl acetate, ethylene propylene diene monomer, polyurea/polyurethane hybrid, and combinations thereof. The polymeric coating can also optionally include fiberglass, roughening agents or other fillers.

In a preferred embodiment, the polymeric coating 20 is polyurea.

The polymeric coating can be applied to various types of filter media packs 12. In one embodiment depicted in FIGS. 1 and 9-10, the filter media pack 12 is constructed of a fluted filter media and particularly stacked strips of fluted filter media. As shown in FIG. 4, in one embodiment, the fluted filter media includes a face sheet 26 and a fluted sheet 28 in a stacked configuration to form inlet and outlet flutes, plugged at opposite ends, e.g., adjacent either first flow face 16 or second flow face 18 such that unfiltered fluid must pass through the face sheet 26 or the fluted sheet 28 to pass from the first flow face 16 to the second flow face 18. Typically, the face sheet 26 will be secured to the fluted sheet 28 and then cut to form strips. These strips of a section of face sheet 26 secured to fluted sheet 28 will then be stacked to form the filter media pack 12. Alternatively, the face sheet 26 and fluted sheet 28 will be secured together and then wound to form a wound filter media pack 12. Adhesive or other sealant is located between layers of the filter media pack 12 to close off the flutes and force fluid (such as air) to flow through the media. In a preferred embodiment, a span S from the first flow face 16 to the second flow face 18 is at least 8 centimeters.

Figures 5, 6:
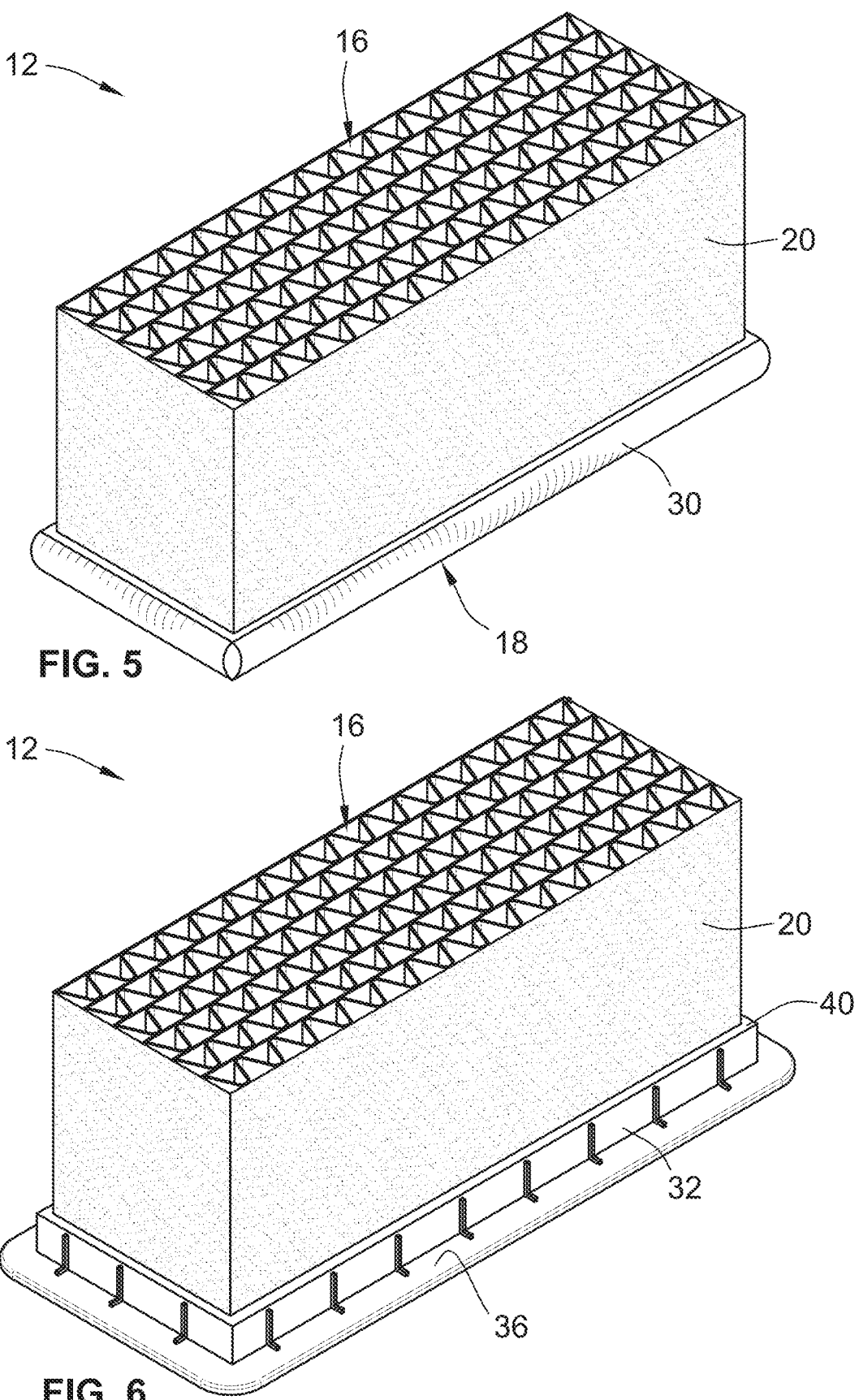
FIG. 5 depicts the stacked filter media pack of FIG. 4 with a border gasket.
FIG. 6 depicts the stacked filter media pack of FIG. 4 with a frame.

FIGS. 4-8 depict steps for assembling various embodiments of the filter element. Beginning in FIG. 4, a stacked filter media pack 12 is provided. The stacked filter media pack 12 has the polymeric coating 20 applied to the outer surface 14. FIG. 4 depicts a partially coated filter media pack 12. However, as noted above, more or less of the outer surface 14 could be coated, such as illustrated in FIG. 5.

As shown in FIG. 5, a border gasket 30 attached proximal to the second flow face 18 of the filter media pack 12. The border gasket 30 can be a pre-molded part that is adhered or bonded to the polymeric coating 20. Additionally, the pre-molded border gasket 30 can be stretched around the filter media pack 12 such that the border gasket 30 is held in place by a tight frictional engagement between the border gasket 30 and the polymeric coating 20 as a result of the tension in the stretched border gasket 30. Further, the border gasket 30 can be molded directly onto the polymeric coating 20.

In a preferred embodiment, the height of the polymeric coating 20 over the span S is greater than the height of the border gasket 30. This helps to ensure that shear forces on the border gasket 30 are spread over a larger span of the filter media because of the polymeric coating 20. In conventional filter media packs in which the border gasket was bonded directly to the filter media pack, shear forces on the border gasket were localized on the weaker filter media, which frequently caused the filter media to fail and the border gasket to tear free from the filter media pack. With the present polymeric coating 20, not only is the border gasket 30 provided with a better sealing or bonding surface, but also the shear forces on the border gasket 30 are spread over a larger span of the filter media because of the polymeric coating 20 instead of localized on the filter media pack 12.

The border gasket 30 can be directly molded to the polymeric coating 20. In such embodiments, the border gasket 30 is molded in place and integrally bonded to the polymeric coating 20. In such instances, the border gasket is selected for its compatibility with the polymeric coating 20 such that a strong adhesion is formed. Suitable seal materials include polyurethane, urethane, and silicone. In a preferred embodiment, a polyurethane seal material is used with a polyurea coating 20.

Figure 15A:
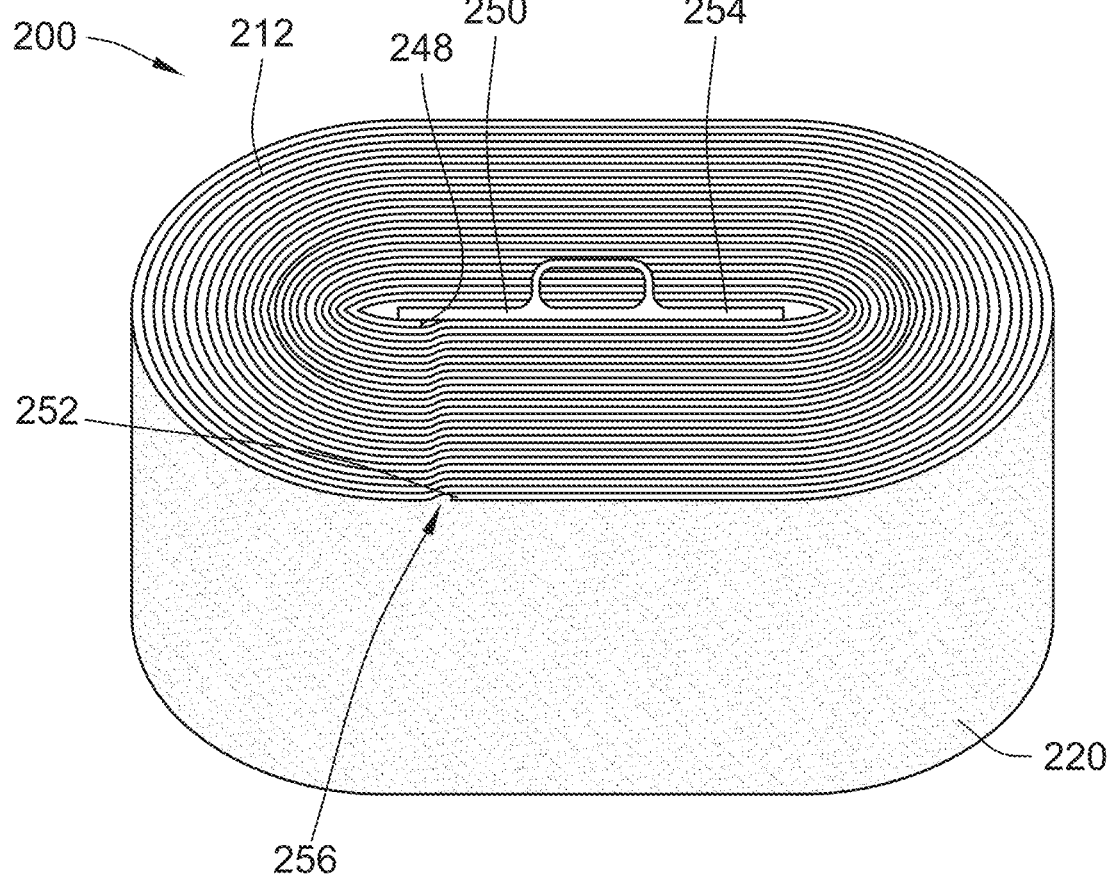
FIG. 15A depicts an isometric view of alternate embodiment of a fluted filter element having an annular shape.
Figure 15B:
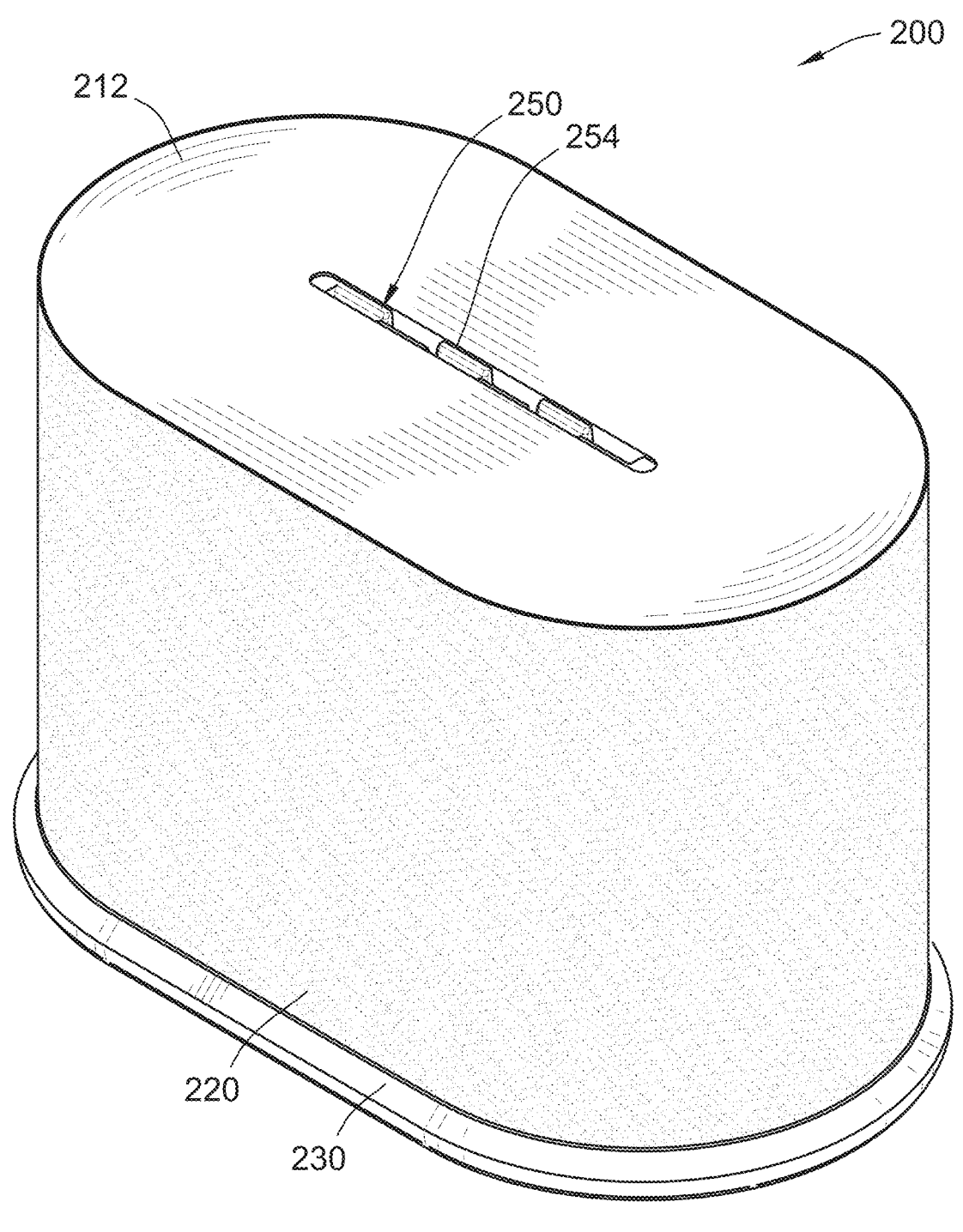
FIG. 15B depicts an isometric view of the filter element of FIG. 15A with a border gasket.
Figure 15C:
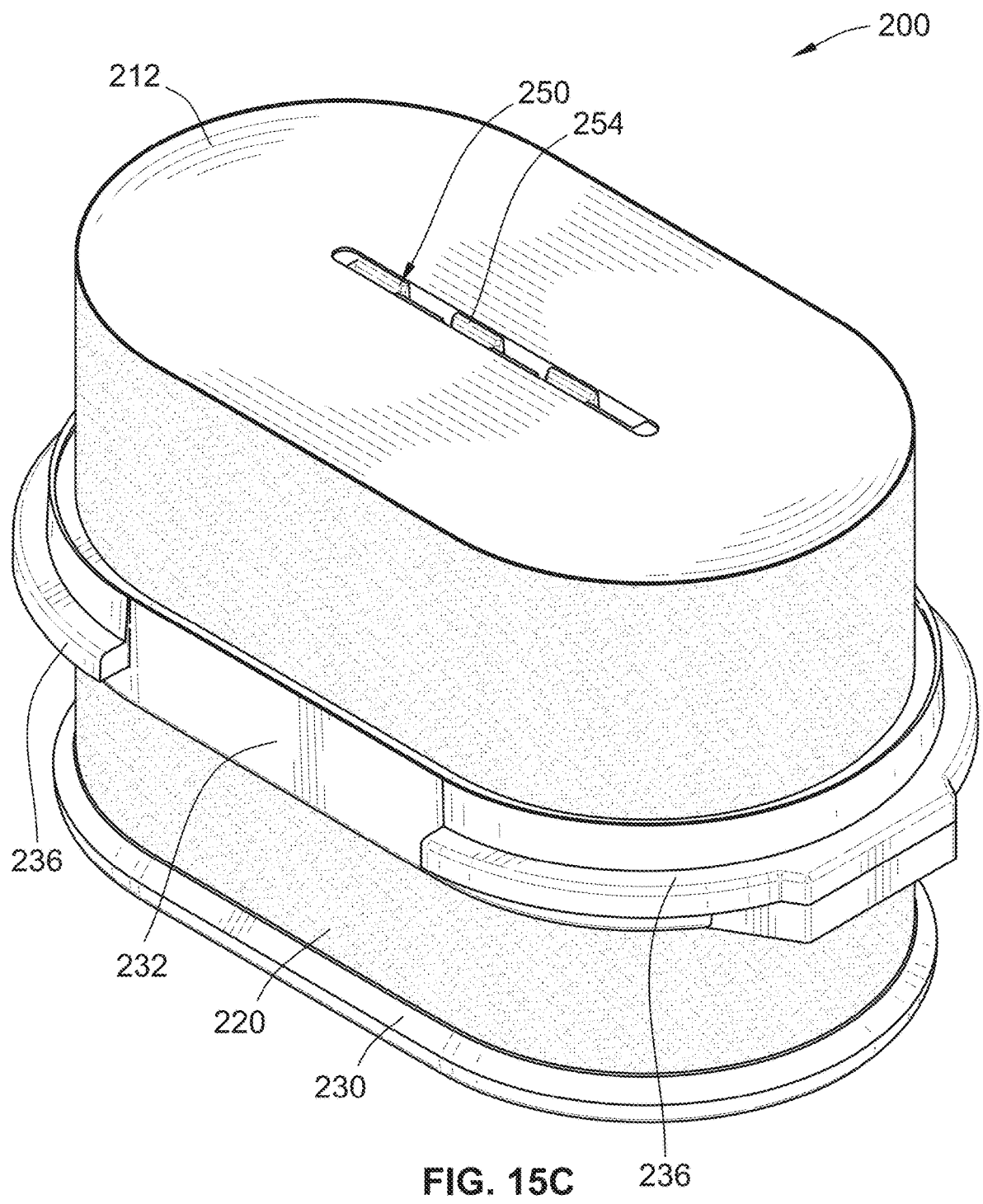
FIG. 15C depicts an isometric view of the filter element of FIG. 15B also having a mid-mount frame.
Figure 15D:
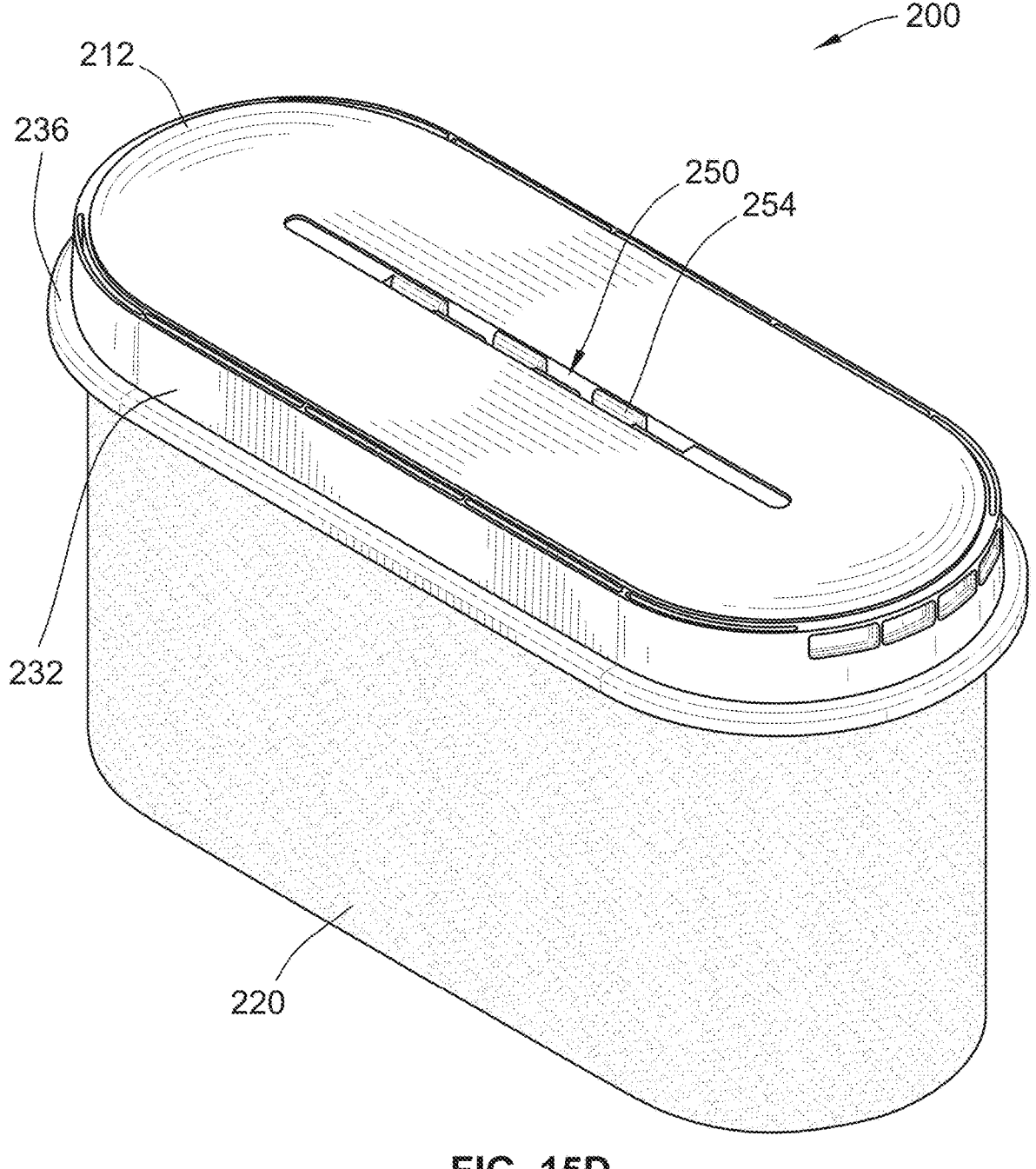
FIG. 15D depicts an isometric view of the filter element of FIG. 15A with just a frame.
Figure 15E:
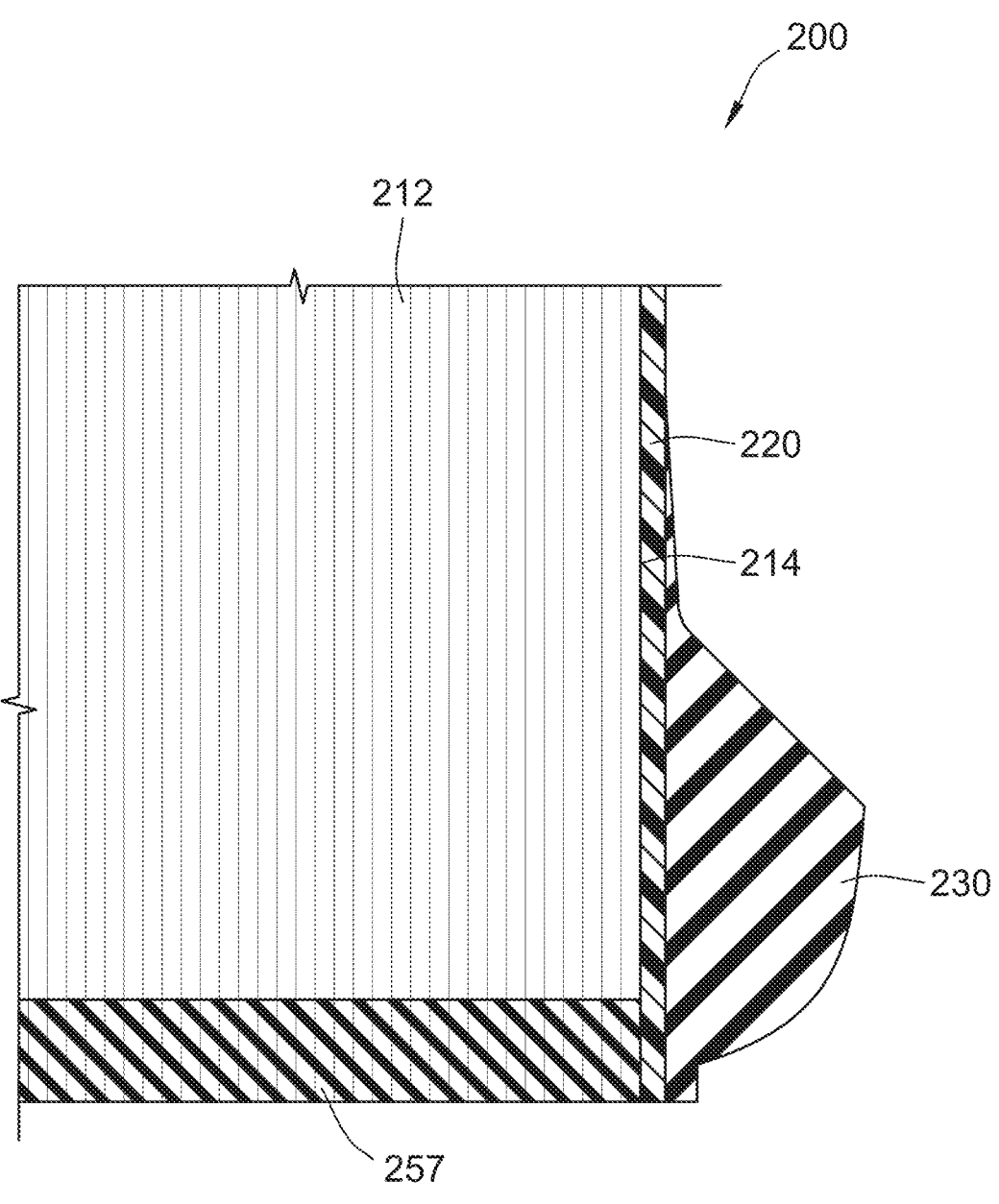
FIG. 15E depicts a partial cross-sectional view of the filter element of FIG. 15B further depicting the adhesive reinforcement structure.
Figure 15F:
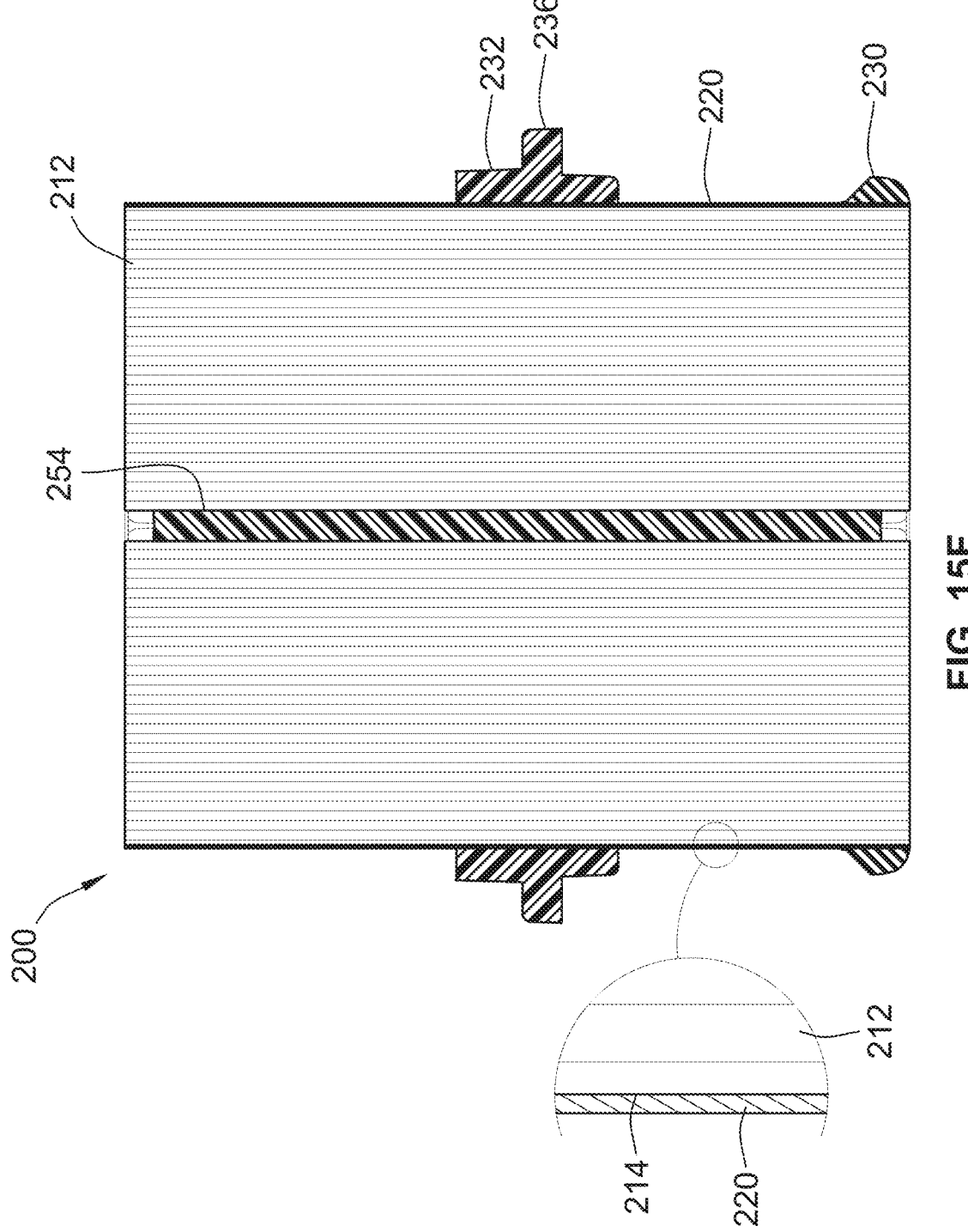
FIG. 15F depicts a cross-sectional view of the filter element of FIG. 15C.
Figure 15G:
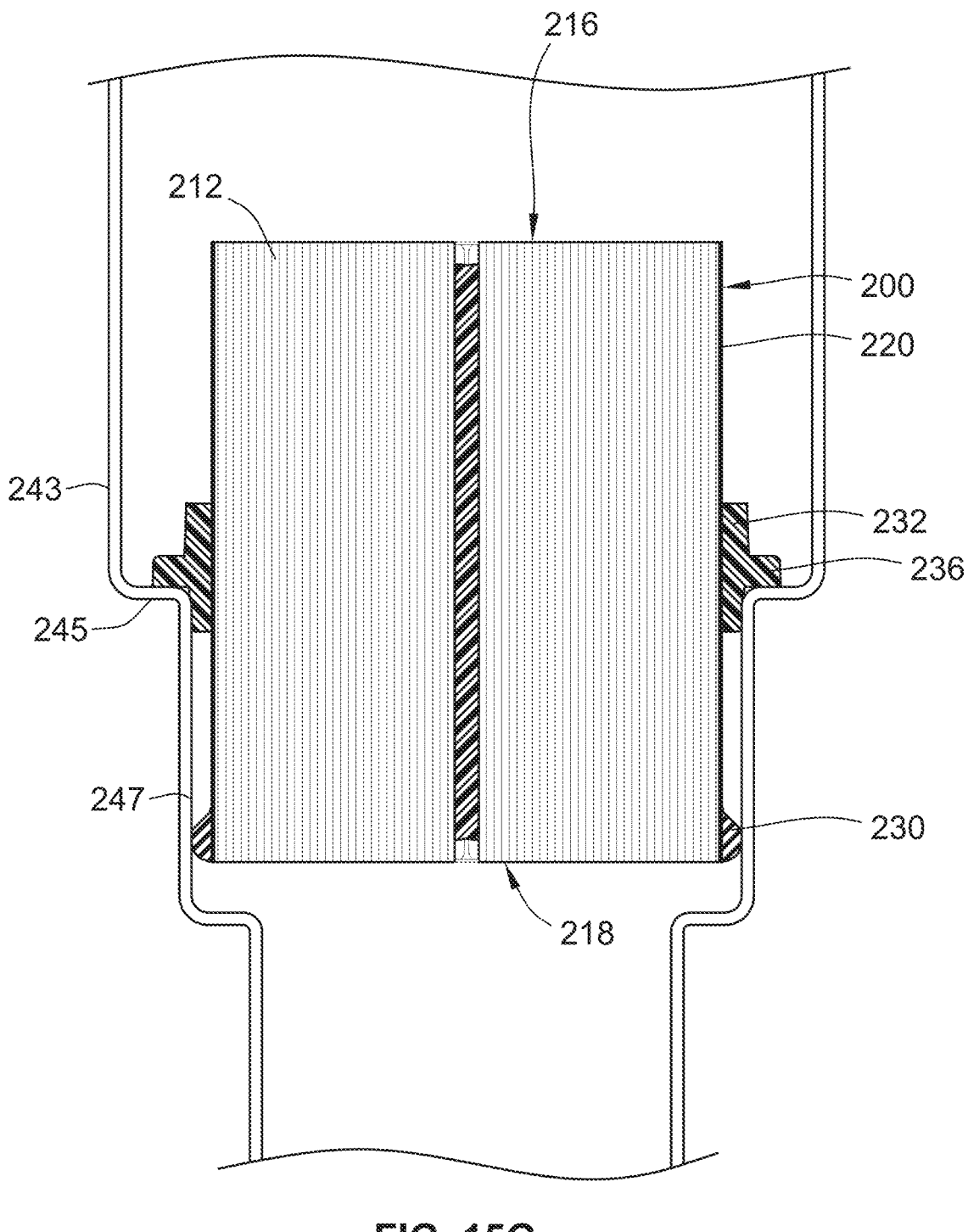
FIG. 15G depict a cross-section view of the filter element of FIG. 15C as inserted into a filter housing.

In some embodiments, the border gasket 30 can provide a sealing surface for directly sealing with a filter housing (similar to the border gasket 230 sealing with filter housing 243 depicted representatively in FIG. 15G).

Figures 7, 8:
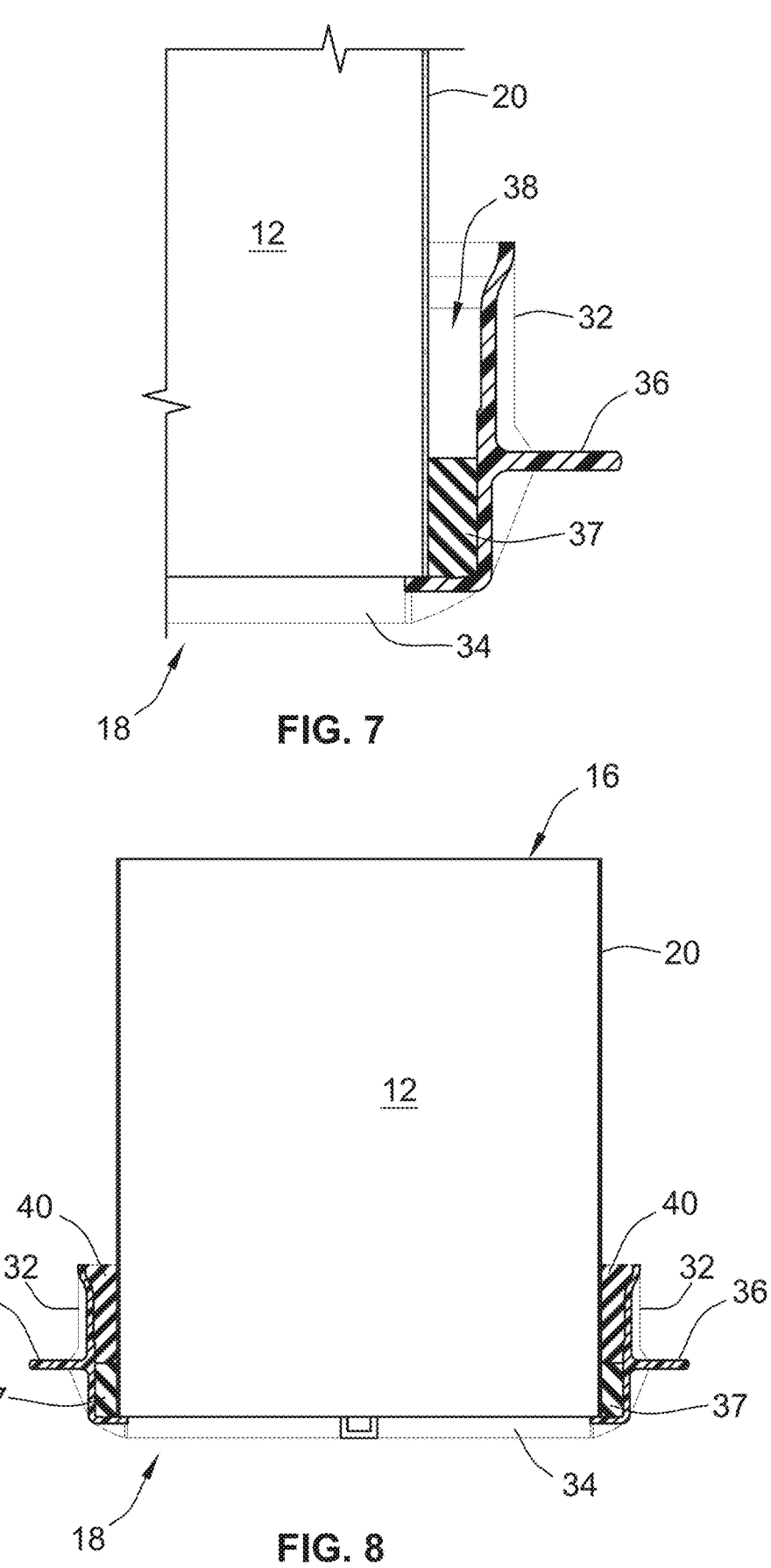
FIG. 7 depicts a partial cross-sectional view of the stacked filter media pack with a frame of FIG. 6.
FIG. 8 depicts a cross-sectional view of the stacked filter media pack with a frame of FIG. 6 filled with seal material.

As shown in FIG. 6, in an alternative embodiment, the filter media pack 12 and polymeric coating 20 could instead be inserted into a frame 32, including a face structure 34 (shown in FIG. 7). With reference to FIG. 7, the frame 32 also includes a protruding ledge 36 that extends around the perimeter of the frame 32 and radially outward. FIG. 7 shows a partial sectional view of the filter media pack 12 and polymeric coating 20 inserted into the frame 32. As can be seen, the filter media pack 12 rests against the face structure 34, and a flexible sealing material 37 is deposited into a peripheral channel 38 between a portion of the frame 32 and the polymeric coating 20 (which has coated the outer surface 14 and penetrated into the filter media pack 12). The flexible sealing material 37 prevents leak paths between the frame 32 and the polymeric coating 20. Next, the peripheral channel 38 is filled with a bonding material 40 as shown in FIG. 8 to secure the frame 32 to the polymeric coating 20. In alternative embodiments, flexible sealing material 37 may be attached to the polymeric coating 20 prior to the filter media pack 12, polymeric coating 20, and flexible sealing material 37 assembly being inserted into the frame 32.

In a preferred embodiment, the bonding material 40 is a rigid material, such as urethane. A "rigid" bonding material is a seal material 40 having a Shore A Durometer of at least 80. Finally, as shown in FIG. 1, an outer gasket 42 for sealing with a filter housing is molded, adhered, or otherwise secured to the protruding ledge 36.

Advantageously, the polymeric coating 20 provides an improved adherent surface to which features can be attached to the filter element 10. As shown in FIGS. 5 and 8, the polymeric coating 20 is receptive to direct molding or bonding with a border gasket 30 or gluing of a frame 32. Prior wraps, especially polyester nonwovens, are unable to provide surfaces that were compatible with a variety of different structures and/or bonding/sealing agents.

Figure 26:
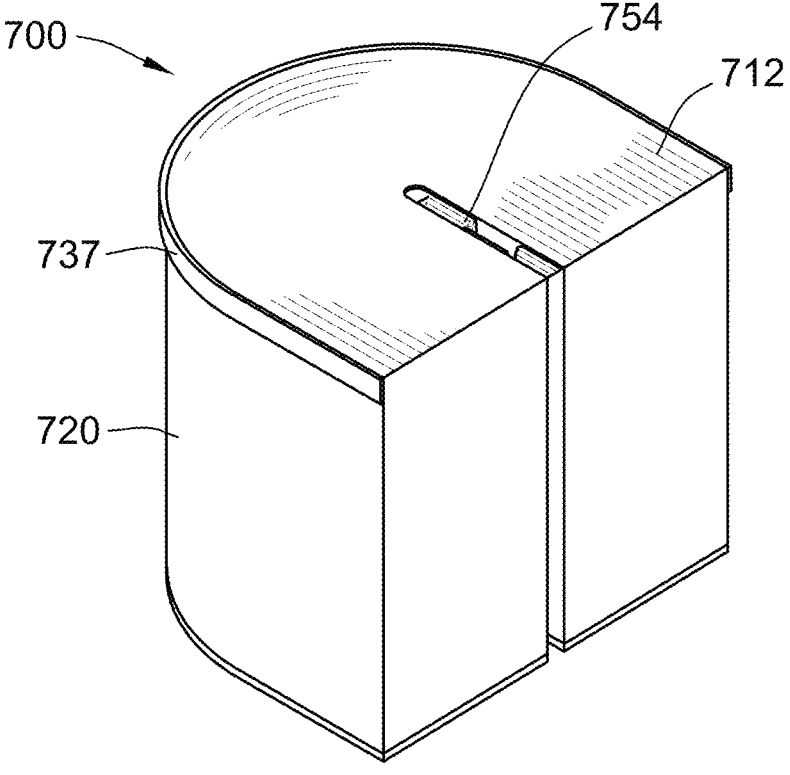
FIG. 26 depicts an isometric, cross-sectional view of a wound filter element having an adhesive foam gasket as the flexible sealing material according to another exemplary embodiment.
Figures 27A, 27B, 28:
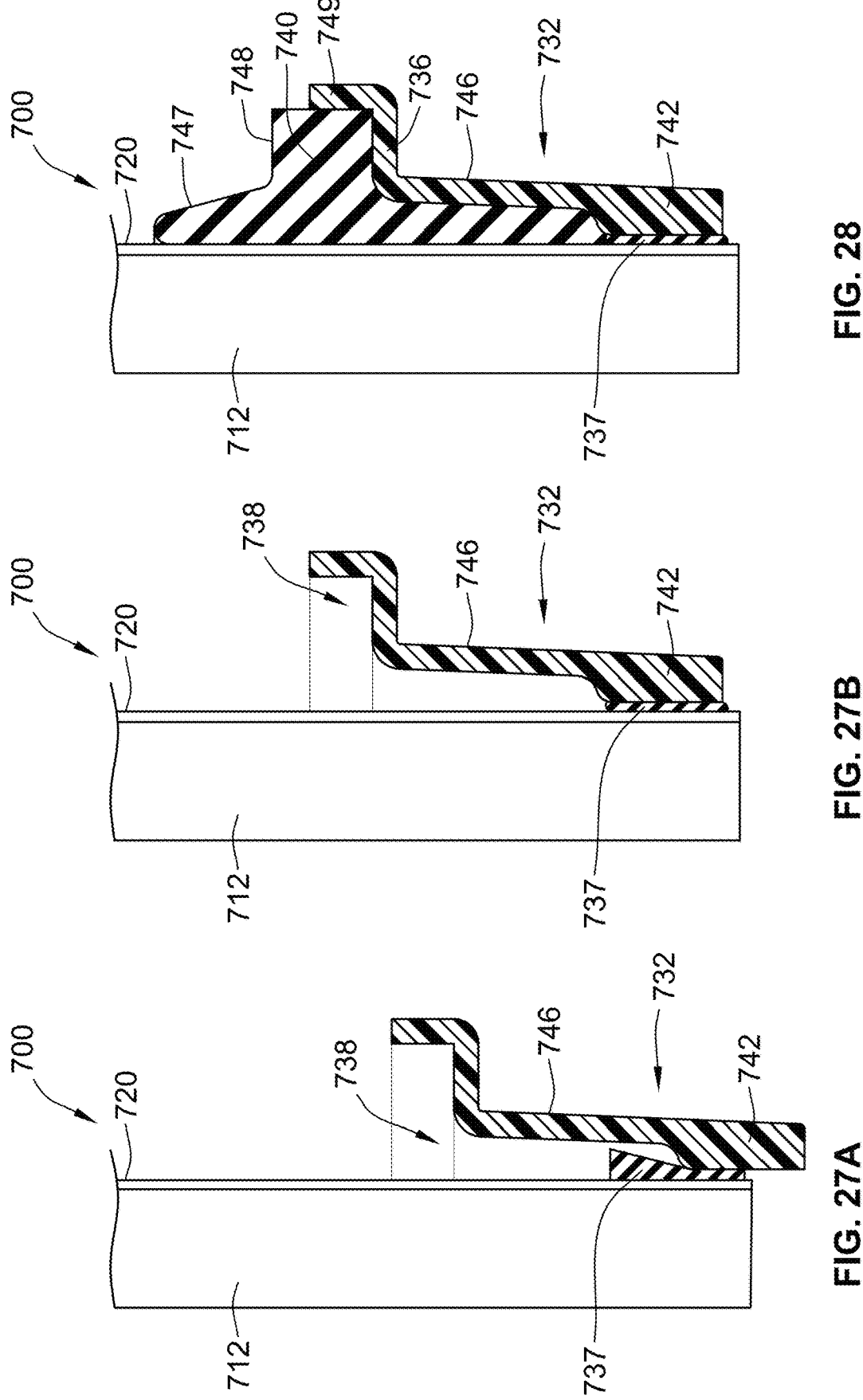
FIGS. 27A and 27B depict partial sectional views of the wound filter element of FIG. 26 as the frame is being located thereon.
FIG. 28 depicts a partial sectional view of the wound filter element of FIG. 27 with a bonding material filling a channel formed by the frame.

In some embodiments, such as in FIGS. 26-28, the flexible sealing material 737 is a pre-formed, low-density foam gasket adhered to the polymeric coating 720 prior to locating the frame 732. As depicted in the isometric, sectional view of FIG. 26, the foam gasket used as the flexible sealing material 737 may be in the form of a foam tape that has an adhesive applied to a single side. In exemplary embodiments, the foam tape can be a polyester or a polyether foam. Additionally, in some embodiments, the adhesive is a pressure-sensitive adhesive.

After the foam gasket is attached to the polymeric coating, the frame 732 is pressed over the foam gasket flexible sealing material 737 as shown in FIGS. 27A and 27B, thereby forming peripheral channel 738. The interior of the frame 732 includes a stepped region in the form of a protrusion 742 that contacts and compresses the flexible sealing material 737. Because the polymeric coating 720 and filter media pack 12 may not conform exactly to the shape of the frame 732, the flexible sealing material 737 provides a seal between the polymeric coating 720 and the frame 732 during manufacturing. For example, radial gaps will occur between the protrusion 742 and the surface created by polymeric coating 720 due to inconsistencies in the shape/dimensions in filter media pack 712. Thus, inserting the frame 732 over the flexible sealing material 737 will cause the flexible sealing material 737 to compress around the perimeter of the polymeric coating 720 and fill any gaps. FIG. 27A shows the frame 732 sliding over the flexible sealing material 737 and compressing it. As shown in FIG. 27B, the frame 732 has been fully inserted over the flexible sealing material 737 and has completely compressed it. Preferably, the flexible sealing material 737 compresses at least 5% around the perimeter of the polymeric coating 720, and more preferably the flexible sealing material compresses at least 10% around the perimeter of the polymeric coating 720. However, the flexible sealing material 737 may compress in excess of 75%.

As mentioned above, placing the frame 732 over the flexible sealing material 737 creates a channel 738 between the polymeric coating 720 and the frame skirt 746. FIG. 28 illustrates that a bonding material 740 fills the channel 738 and, in certain embodiments like those pictured in FIG. 28, extends above the frame 732. The bonding material 740 secures the frame 732 to polymeric coating 720. The flexible sealing material 737 helps to ensure that the bonding material 740 does not leak out of the frame 732 when the bonding material 740 is poured into the channel 738.

A mold can be used when applying the bonding material 740. Thus, as shown in FIG. 28, the bonding material 740 has the additional structures of a tapered region 747 and an axial seal surface 748. The axial seal surface 748 can be used to form a seal for sealing with a housing in the axial direction. In other embodiments, a radial seal could be defined. The frame 732 includes the projection 742, a skirt 746, radially extending ledge 736, and an axially extending flange 749 forming a multi-step, stepped profile. In preferred embodiments, the bonding material 740 is made from polyurethane, urethane, or silicone or another material similar to that used for the border gasket 30 discussed in relation to other embodiments (e.g., FIGS. 5, 15B, 15C, 15E, 15F, and 15G).

While the embodiments of FIGS. 26-28 depict a "racetrack" filter element 700 in which the filter media pack 712 is formed by winding filter media around a winding structure 754, other filter media pack configuration can also be used including, among others, stacked fluted filter media, other wound filter media configurations (e.g., circular), and pleated.

Figure 9:
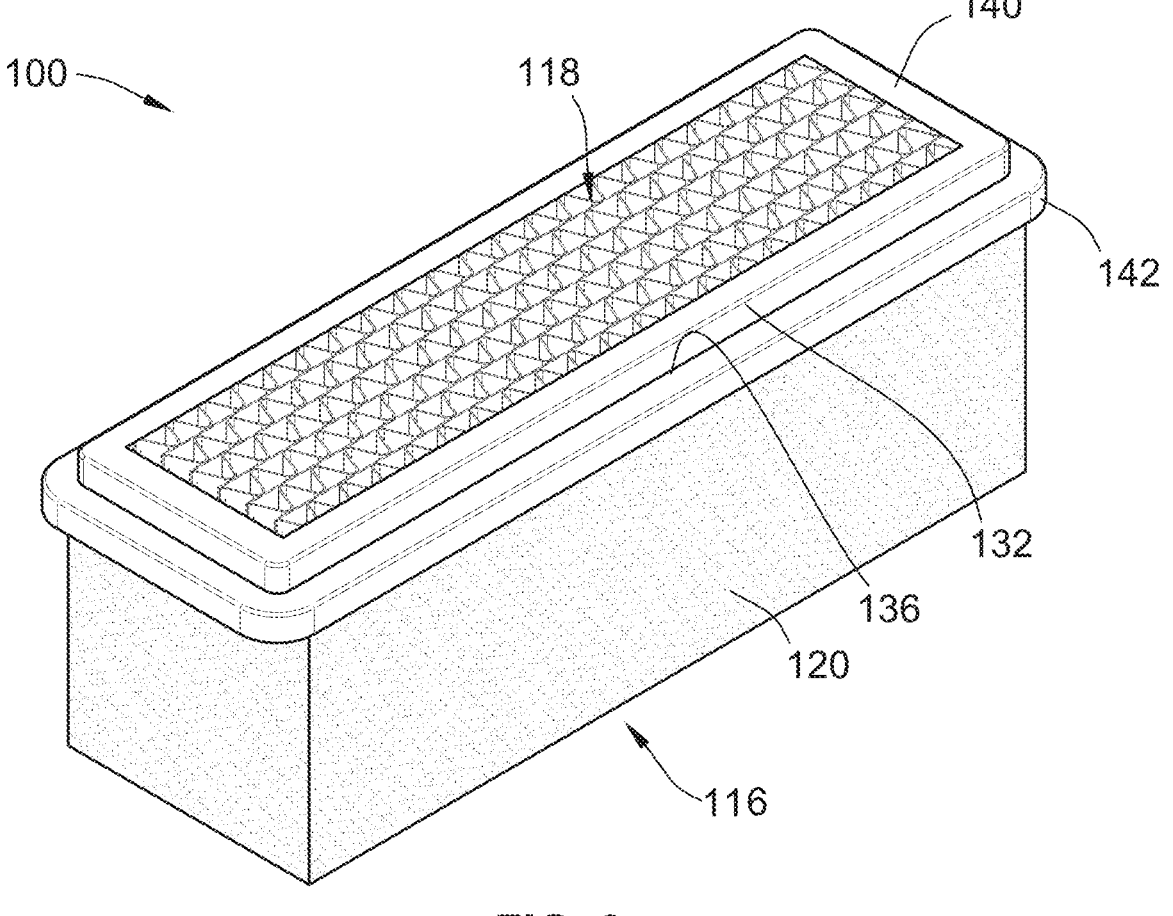
FIG. 9 depicts an isometric view of a second embodiment of a filter element having a stacked fluted filter media.

FIG. 9 depicts an alternate embodiment of a stacked filter media pack filter element 100. FIGS. 10-14 depict a method of assembling the filter element 100 shown in FIG. 9. In this embodiment, the filter media pack 112 and polymeric coating 120 are substantially similar to the filter media pack 12 and polymeric coating 20 of the previous embodiment of the filter element 10. According to this embodied method and beginning with FIGS. 10 and 11, the stacked filter media pack 112 is inserted into a frame 132 such that an end 133 of the frame 132 is coplanar with the second flow face 118 of the filter element 100.

Figures 10, 11:
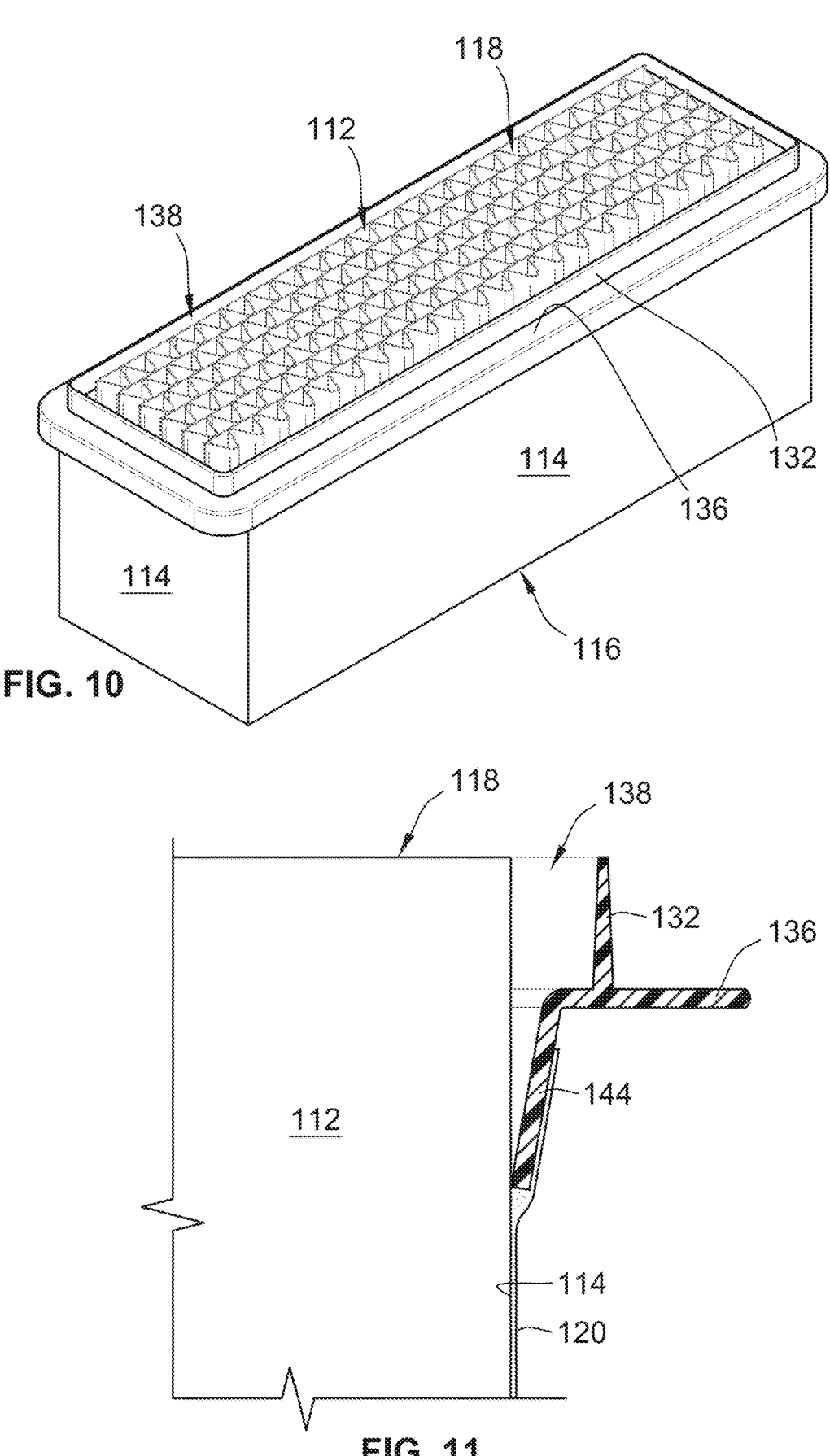
FIG. 10 depicts a stacked fluted filter media with frame that can be used in the embodiment shown in FIG. 9.
FIG. 11 depicts a partial sectional view of the filter media pack and frame of FIG. 10 with a polymeric coating.

As shown in FIG. 11, the frame 132 includes a tapered leg 144 that forms a tight engagement with the outer surface 114 of the filter media pack 112 and that tapers relative to the side wall of the filter media pack 112. As with the prior frame 132, the frame 132 of this embodiment forms a peripheral channel 138 between the filter media pack 112 and the frame 132, and the frame 132 includes a radially outward extending flange in the form of a protruding ledge 136 that extends around the perimeter of the frame 132.

Figures 12, 13:
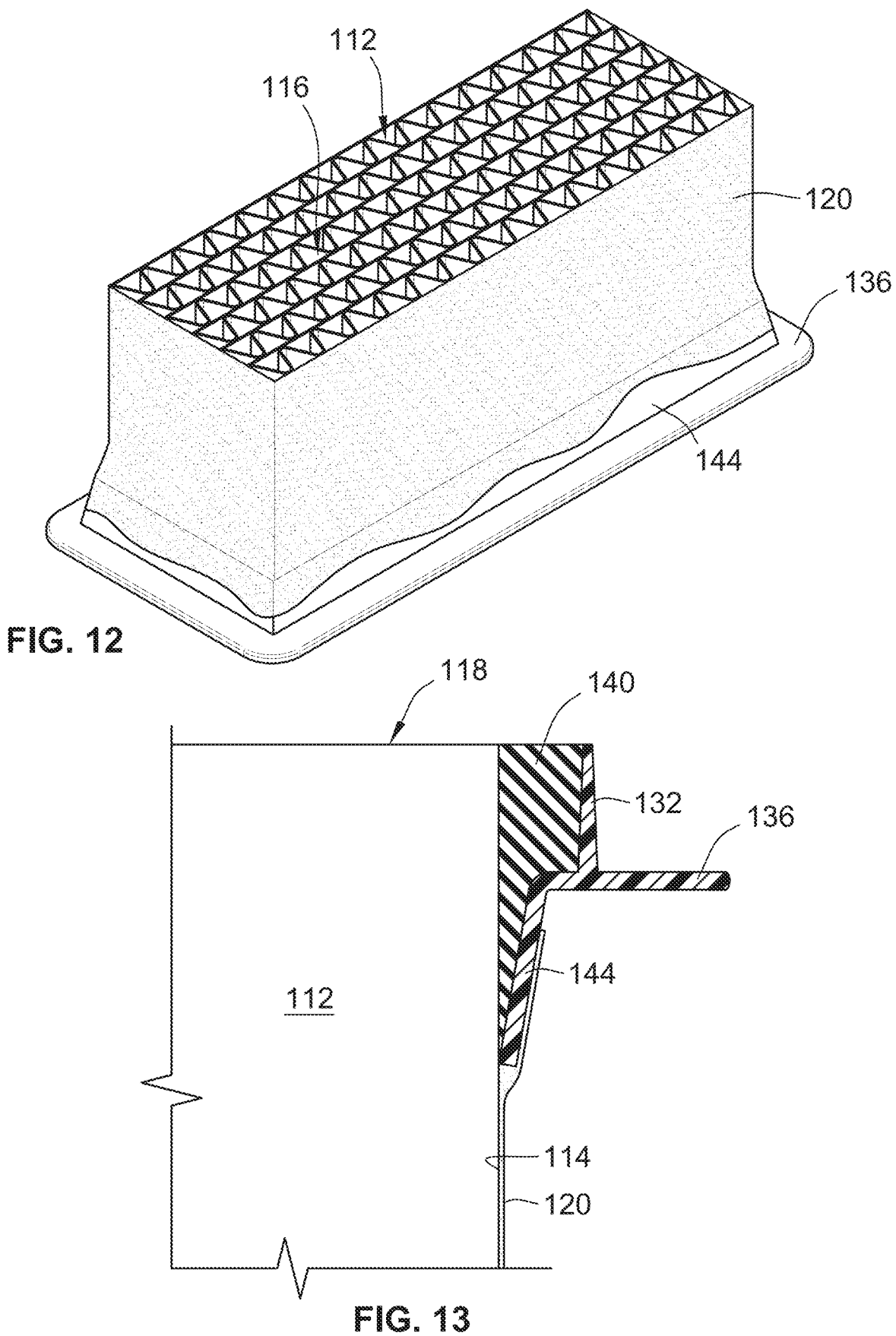
FIG. 12 depicts an isometric view of the filter media pack of FIG. 11 with a polymeric coating.
FIG. 13 depicts a partial sectional view of the filter media pack of FIG. 12 with a seal material applied in the frame.

In this embodied method, the polymeric coating 120 is then applied to the outer surface 114 of the filter media pack 112 and at least a portion of the tapered leg 144 of the frame 132 as depicted in FIGS. 11-12. The polymeric coating can thus help secure the frame 132 to the filter media pack 112. As shown in FIG. 13, the peripheral channel 138 is filled with seal material 140. Preferably, the seal material 140 is a rigid material, such as a urethane resin. The tight engagement between tapered leg 144 and the filter media pack 112 helps prevent leakage of seal material 140 prior to curing.

Figure 14:
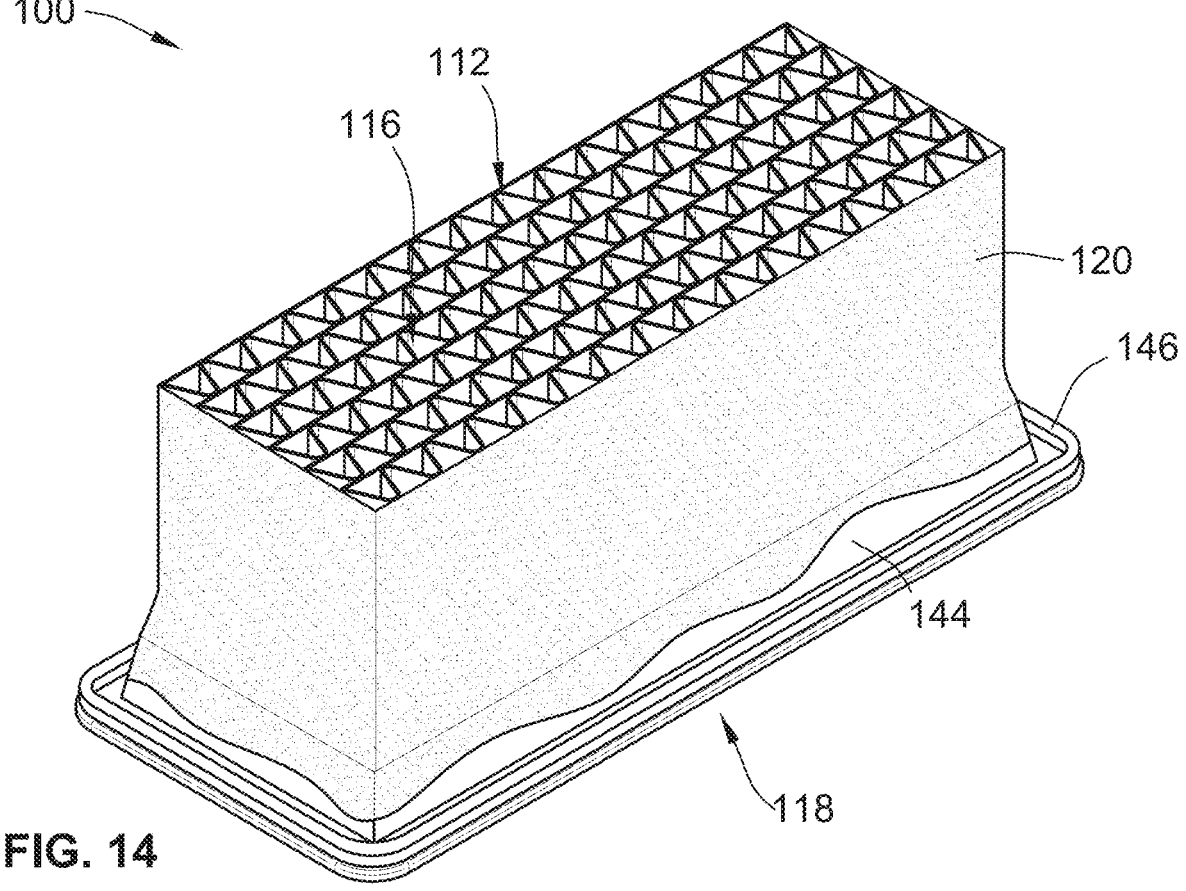
FIG. 14 depicts an isometric view the underside of the filter element depicted in FIG. 9.

As shown in FIG. 14, a gasket 146 is molded, adhered, or otherwise secured to the protruding ledge 136 of the frame 132 to complete the construction of the filter element 100. Like outer gasket 142, gasket 146 seals the filter element 100 to a filter housing (similar to filter housing 243 shown in FIG. 15G).

In another embodiment of a filter element 200 depicted in FIG. 15A, the filter media pack 212 is a wound pack having an annular shape, specifically a racetrack shape. Nevertheless, other wound shapes could be created, including oval, round, and shapes having varied radii of curvature on different sides, and the wound pack should not be interpreted as being limited to any particular wound shape. The filter media pack 212 is preferably formed from a single sheet of fluted filter media. The sheet of fluted filter media is preferably provided by a face sheet secured to a fluted sheet. However other forms of filter media may be employed. The filter media has a leading edge 248 at a center 250 of a pack 212 and a trailing edge 252 of the wound pack 212 along the outer surface 214 (shown in FIGS. 15E and 15F). As depicted in FIG. 15A, the leading edge 248 is bonded to a central winding structure 254 to facilitate winding and which influences the final shape of the filter element 200. However, other embodiments need not incorporate a winding structure 254. The trailing edge 252 terminates at a location along the outer surface 214 of the last winding, which forms a step 256 in the outer surface 214 of the filter media pack 212.

Once the wound filter media pack 212 is formed, the filter element 200 including the wound filter media pack 212 can be assembled similarly to the filter element 200 having a stacked filter media pack 212, i.e., according to either the steps depicted in FIGS. 4-8 or the steps depicted in FIGS. 10-14. As in the previous embodiments, the polymeric coating 220 is applied to the outer surface 214. In this case, the polymeric coating 220 fills in and seals the step 256 and prevents unfiltered fluid flow leakage. Preferably, the polymeric coating 220 is applied without any additional materials applied along the step 256 between the polymeric coating 220 and the fluted filter media filter pack 212. For instance, in some embodiments, the use of polymeric coating 220 eliminates the need for an adhesive bead to be laid at the trailing edge 252 extending between the first and second flow faces 216, 218. Further, the polymeric coating 220 can provide an improved aesthetic appearance by hiding step 256.

As shown in FIG. 15B, a border gasket 230 can be adhered, bonded, molded, or otherwise secured to an end of the polymeric coating 220. As shown in FIG. 15C, the filter element 200 can also feature a mounting frame 232 with a protruding ledge 236 that extends around at least a portion of the frame 232. Frame 232 is attached to the polymeric coating. As shown in FIG. 15C, the frame is mid-mounted, i.e., the frame 232 is located approximately half-way between the first flow face 216 and the second flow face 218. FIG. 15D depicts a filter element 200 in which no border gasket 30 is provided and the frame 232 is mounted near the first flow face 216. The seal would be provided adjacent ledge 236.

FIG. 15E depicts a partial cross-sectional view of a filter element 200 in which the second flow face 218 has been reinforced using an adhesive material to create an adhesive reinforcing structure 257. Such an adhesive reinforcing structure 257 is described in co-pending International Patent Application having serial number PCT/US2015/054739 (referred to as "the '739 application") filed Oct. 8, 2015, owned by the owner of the instant application, the teachings of which are incorporated herein by reference thereto in their entireties. The combination of the adhesive reinforcing structure 257 and the outer layer polymeric coating 220 described above provides improved stability and strength to the filter media pack 212. The adhesive reinforcing structure 257 can be applied to one or both flow faces 216, 218 of the filter element 200.

FIG. 15F depicts a cross-sectional view of the filter element 200 shown in FIG. 15C. FIG. 15G depicts a cross-sectional view of the filter element 200 inserted into a filter housing 243. As can be seen in FIG. 15G, the protruding ledge 236 of the frame 232 contacts a shelf region 245 of the housing 243 to position the filter element 200 within the housing 243. A seal is created between the border gasket 230 and a lower wall region 247 of the filter housing 243 to prevent air bypass around the filter element 200. In a preferred embodiment, air flows through the first flow face 216 to the second flow face 218 such that the air pressure on the filter element 200 ensures that the frame 232 remains in tight contact with the shelf region 245.

Figure 16A:
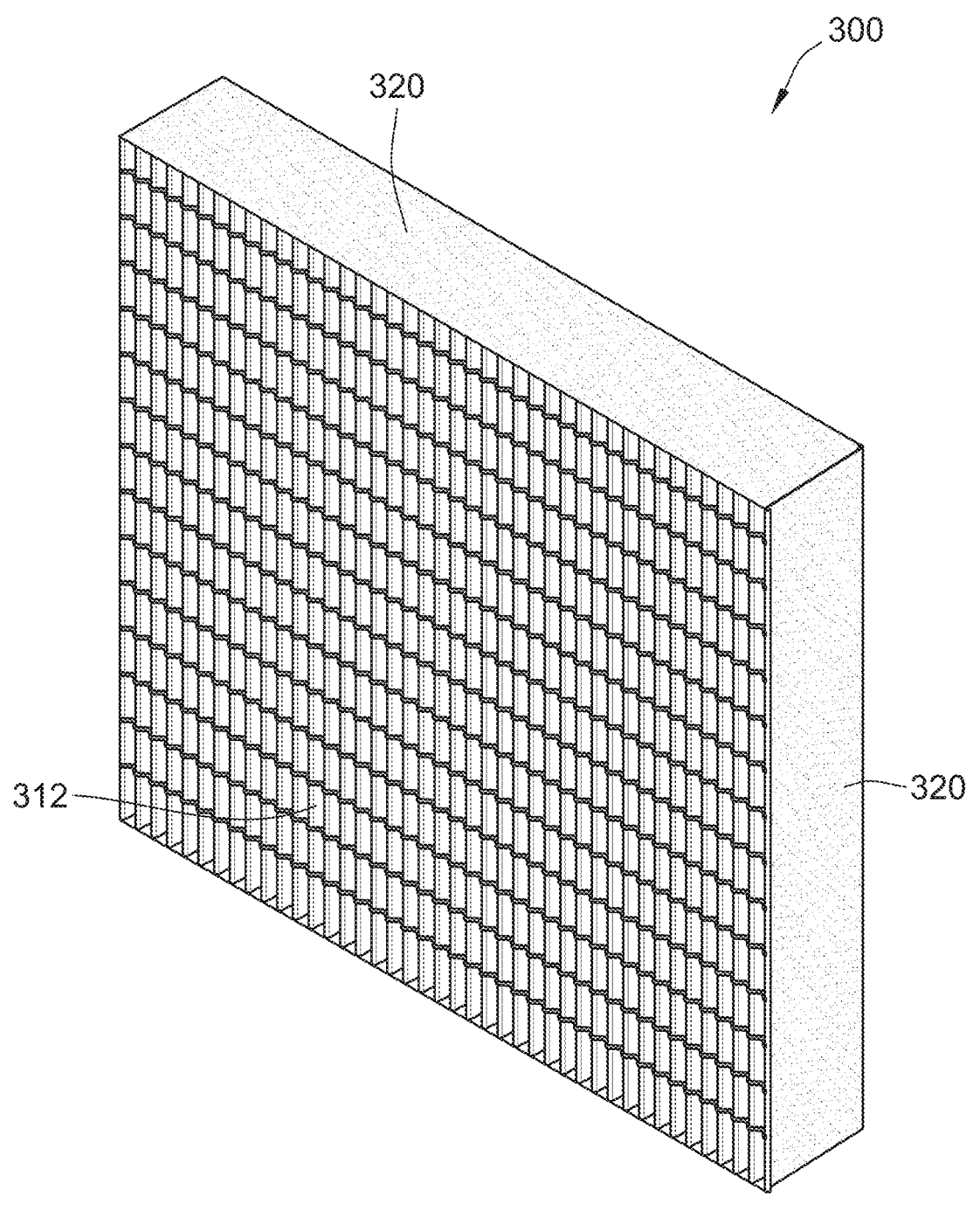
FIGS. 16A-B depicts an alternate embodiment of a filter element having a pleated filter media.
Figure 16B:
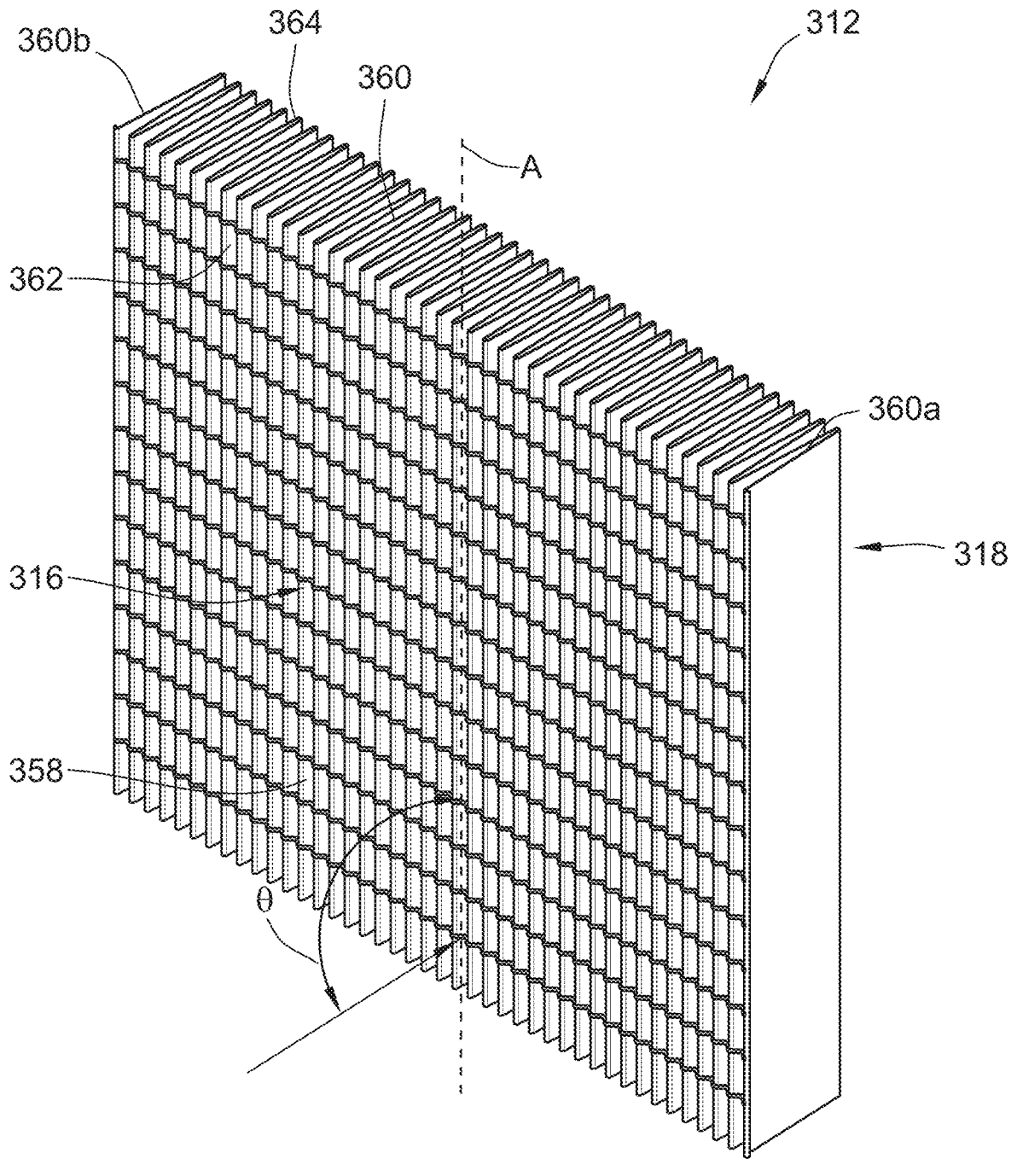

Another embodiment of a filter element 300 is depicted in FIG. 16A. FIG. 16B depicts the filter media pack 312, which includes pleated filter media 358 having a plurality of pleat flanks 360 extending between pleat tips 362 at the first flow face 316 and pleat tips 364 at the second flow face 318. Unfiltered fluid passes through the filter media 358 to pass from the first flow face 316 to the second flow face 318. The filter media 358 has a leading-most pleat flank 360a and a trailing-most pleat flank 360b. As shown in FIG. 16A, the polymeric coating 320 is applied to the leading-most pleat flank 360a and the trailing-most pleat flank 360b. Additionally, the polymeric coating 320 is applied along the edges of the pleat flanks 360 that extend transverse to the leading-most pleat flank 360a and the trailing-most pleat flank 360b.

Figures 17, 21:
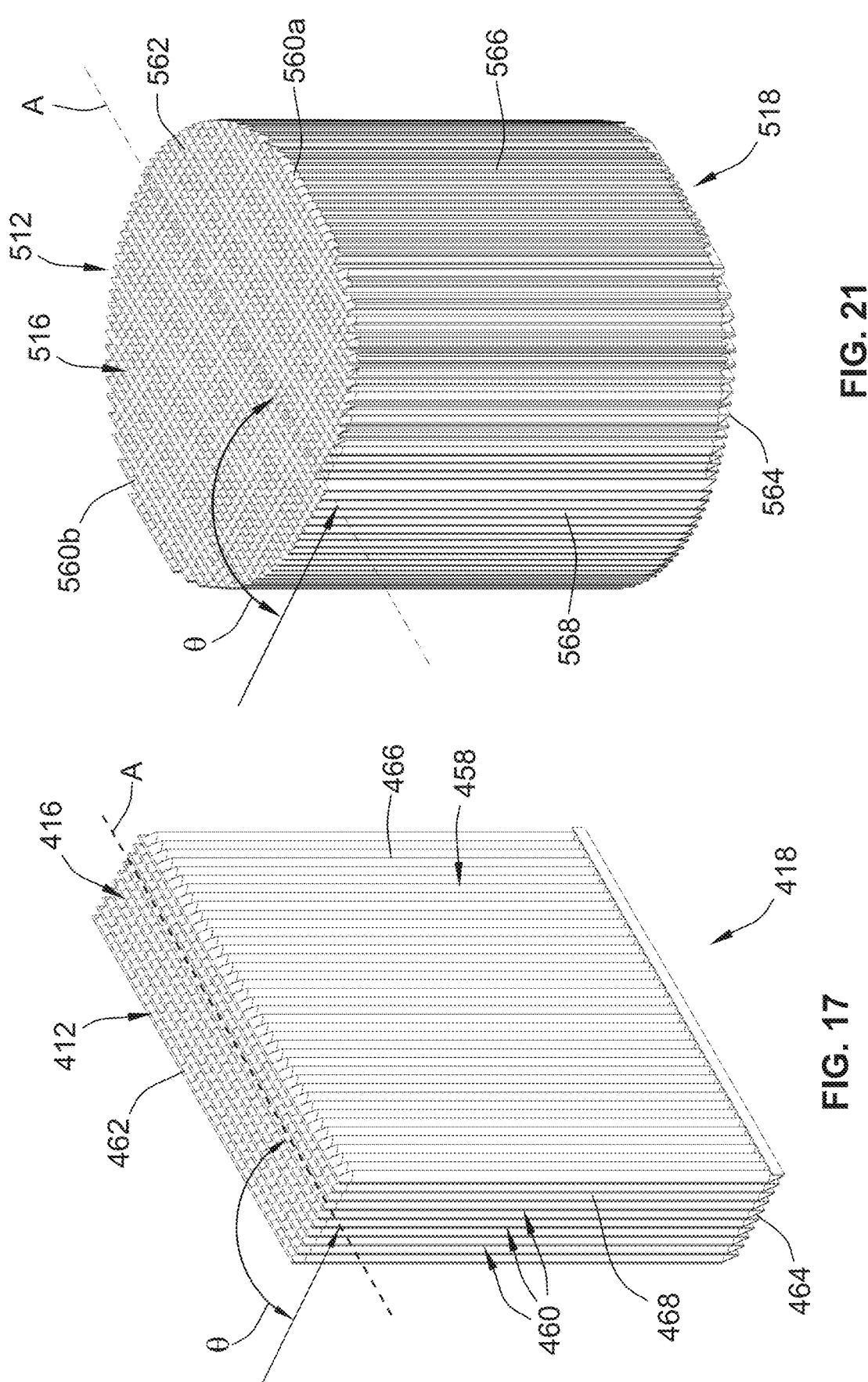
FIG. 17 depicts an isometric view of an embodiment of a rectangular embossed and pleated filter media pack.
FIG. 21 depicts an isometric view of another alternate embodiment of a cylindrical embossed and pleated filter media pack.
Figure 18:
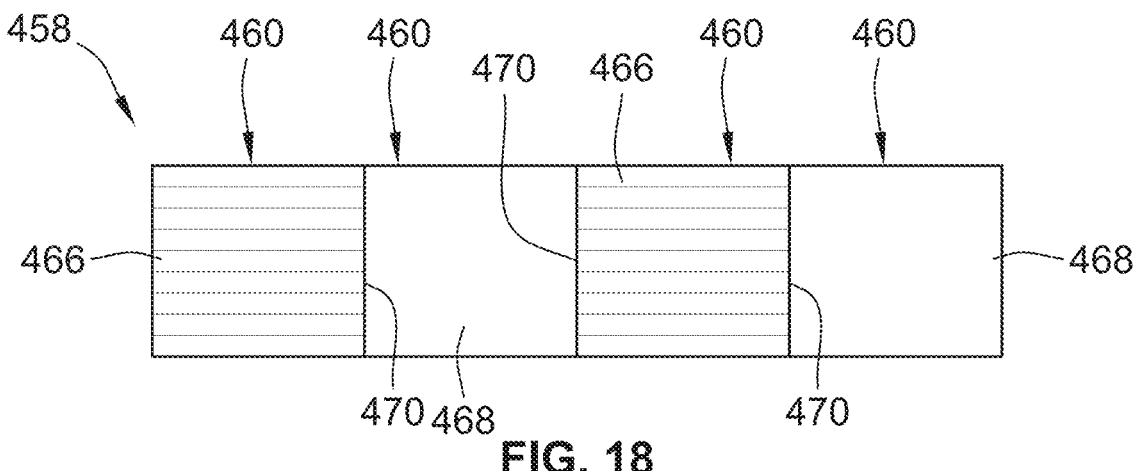
FIG. 18 depicts a representation of the filter media of the filter media pack of FIG. 17.
Figure 20:
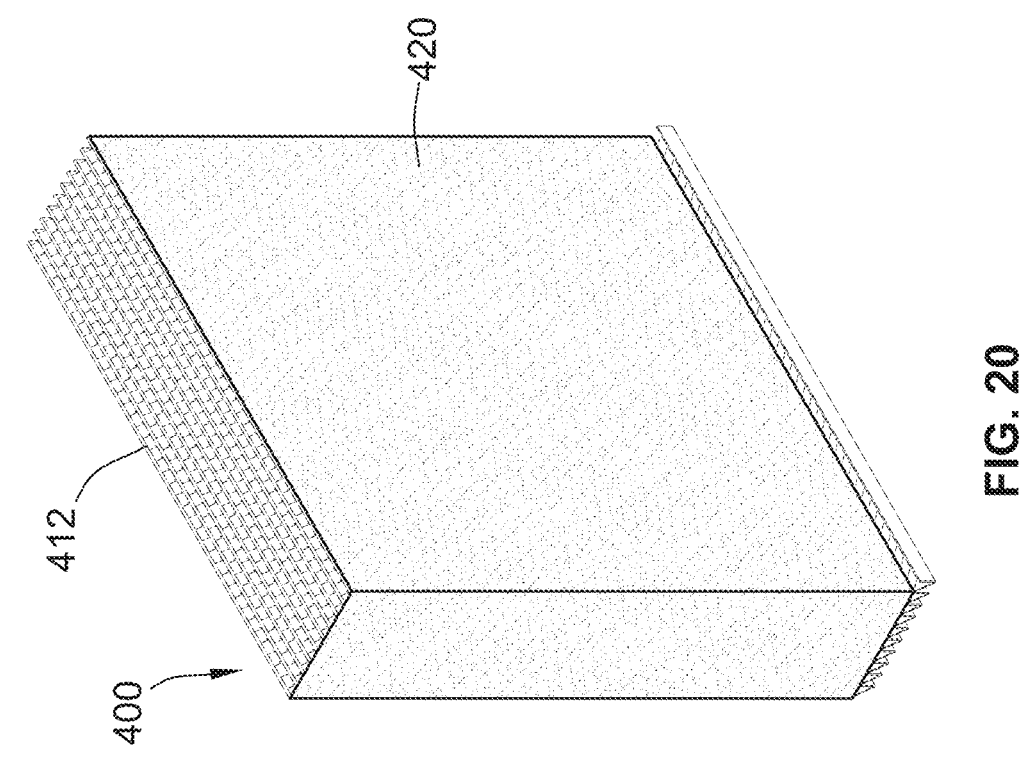
FIG. 20 depicts an isometric view of the filter media pack of FIG. 17 as coated with a polymeric coating.

Still another embodiment of pleated and embossed filter element 400 is provided in FIGS. 17-20. FIG. 17 depicts a rectangular filter media pack 412 having a pleated media 458 including a plurality of pleat flanks 460 extending between pleat tips 462 on a first flow face 416 and pleat tips 464 on a second flow face 418. The pleat flanks 460 depicted in FIG. 17 alternate between embossed pleat flanks 466 and flat pleat flanks 468. Embossed pleat flanks 466 have been pressed, shaped, or otherwise formed to include ridges along the entire flank or only a portion of the flank. A system and method of embossing a pleated media and embodiments of an embossed and pleated filter media are provided in U.S. Provisional Application No. 62/243,740, titled "Filter Media Packs, Methods of Making and Filter Media Presses," filed on Oct. 20, 2015, the teachings of which are incorporated herein by reference thereto in their entireties. FIG. 18 depicts a portion of the pleat media 458 with the pleats 460 laid out flat. As shown in FIG. 18, the pleat flanks 460 alternate between embossed pleat planks 466 and flat pleat flanks 468 at fold lines 470. When folded along fold lines 470, the pleated structure takes shape as shown representatively in FIG. 19. FIG. 20 depicts the filter media pack 412 as coated with the polymeric coating 420. As in the prior embodiments, a border gasket or frame can be molded, adhered, bonded, or otherwise secured to the polymeric coating 420, as desired by the user.

Figure 22:
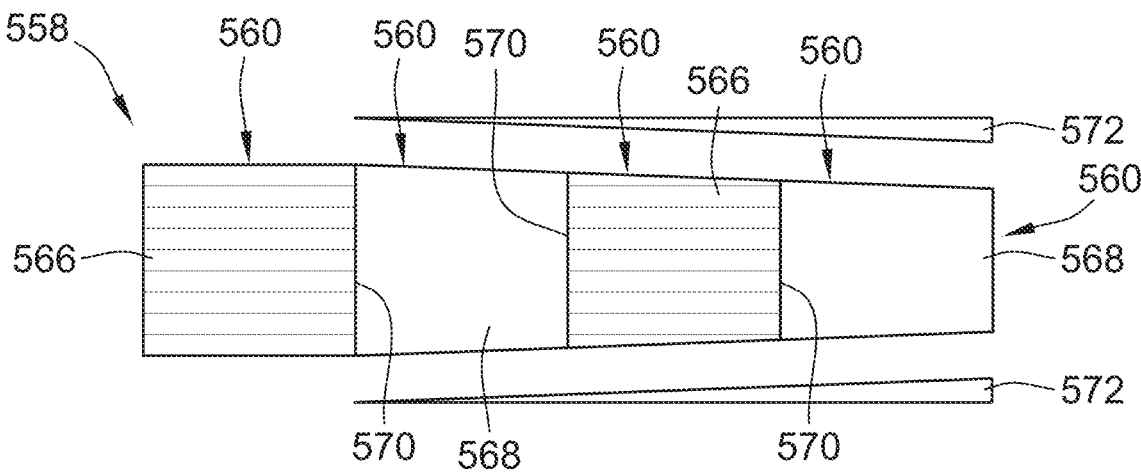
FIG. 22 depicts a representation of the filter media of the filter media pack of FIG. 21.
Figure 19:
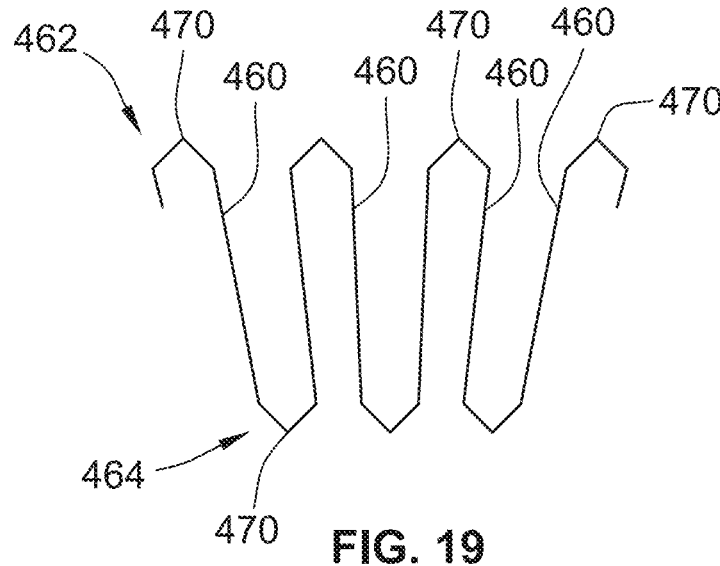
FIG. 19 depicts a representation of the filter media of FIG. 18 being folded to form the filter media pack of FIG. 17.
Figure 23:
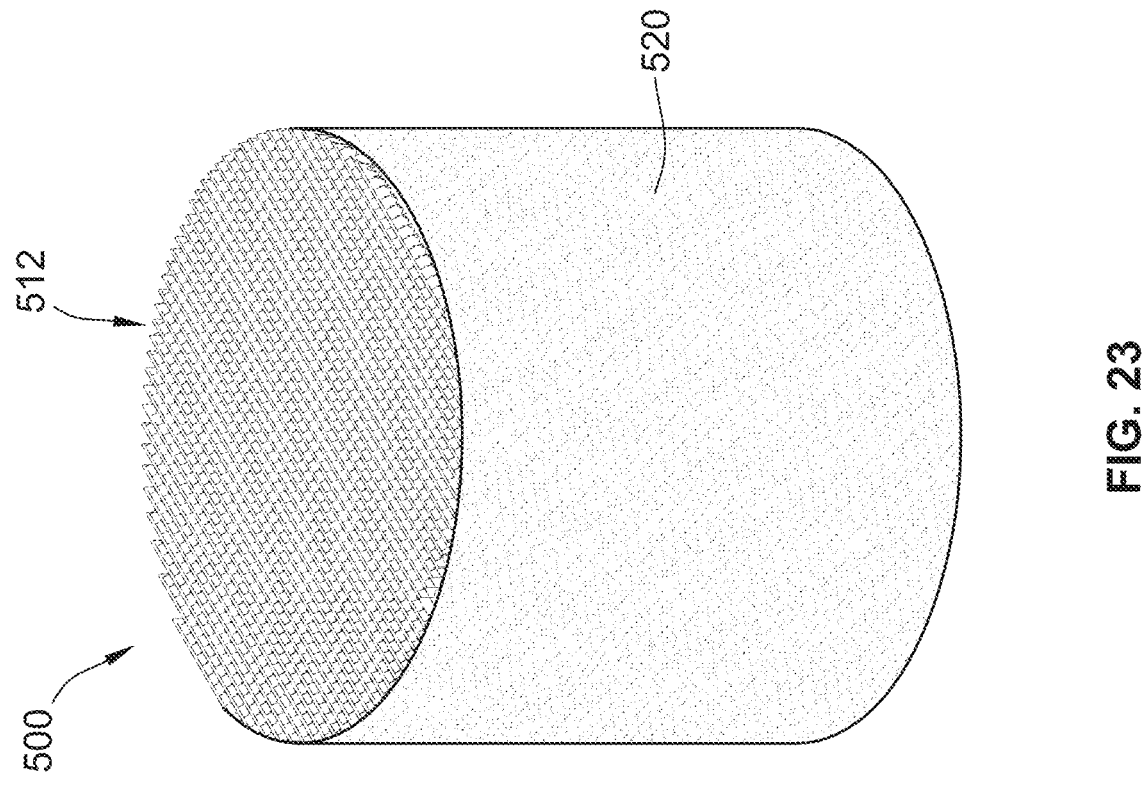
FIG. 23 depicts an isometric view of the filter media pack of FIG. 21 as coated with a polymeric coating.

A further embodiment of a pleated and embossed filter element 500 is provided in FIGS. 21-23. FIG. 21 depicts a cylindrical filter media pack 512 having pleated media 558 including a plurality of pleat flanks 560 extending between pleat tips 562 on a first flow face 516 and pleat tips 564 on a second flow face 566. The pleat flanks 460 depicted in FIG. 21 alternate between embossed pleat flanks 566 and flat pleat flanks 568. FIG. 22 depicts a portion of the pleat media 558 with the pleats 560 laid out flat. As can be seen in FIG. 22, the pleat flanks 560 alternate between sections of embossed pleat flanks 566 and sections of flat pleat flanks 568. The interface between these sections provides fold lines 570 by which to form the pleated structure. To create the circular shape of the flow faces 516, 518 of the filter media pack 512, trim sections 572 are removed from the filter media 558 so that the width of the pleat flanks 560 transitions from narrow at a leading-most pleat flank 560*a* to widest at the center of the pleated filter media 558 to narrow again at the trailing-most pleat flank 560*b* (sec, e.g., FIG. 21). FIG. 23 depicts the filter media pack 512 as coated with the polymeric coating 520. As in the prior embodiments, a border gasket or frame can be molded, adhered, bonded, or otherwise secured to the polymeric coating 520, as desired by the user.

As discussed, a variety of filter element types can benefit from the polymeric coating 20. Generally, the filter media packs of the filter elements will have filter media with the following properties: a basis weight of between 2 and 4 ounces/square yard; an air permeability of between 5 and 20 cfm (cubic feet per minute) @ 0.5 inch of water gauge pressure, measured according to ASTM F778-88 (2014); and a Mullen burst strength of at least 15 PSI.

Additionally, the filter media can be described in terms of the air filtration efficiency. A typical filter media of the type used with the present invention will have an initial air filtration efficiency of at least 99.6% at removing ISO 12103-1 A2 Fine Test Dust, measured according to ISO 5011 test standard. Further, the air filtration media can include a layer containing at least one of cellulose, polymer, or glass fibers having an average diameter of between 1 and 200 micron.

As discussed above, the polymeric coating 20, 120, 220, 320, 420, 520, 720 can be applied to the filter media pack 12, 112, 212, 312, 412, 512, 712 using a variety of applicator tools. In preferred embodiments, the polymeric coating 20, 120, 220, 320, 420, 520, 720 is applied using a sprayer that is spaced apart from the filter media pack 12, 112, 212, 312, 412, 512, 712. In embodiments, the sprayer revolves around the filter media pack 12, 112, 212, 312, 412, 512, 712 while the filter media pack is stationary. However, in other embodiments, the sprayer can be stationary while the filter media pack 12, 112, 212, 312, 412, 512, 712 rotates in front of the sprayer.

Additionally, in certain embodiments, the distance between the sprayer and the media pack changes during the application of the polymeric coating 20, 120, 220, 320, 420, 520, 720. The distance between the sprayer and the filter media pack 12, 112, 212, 312, 412, 512, 712 can change by moving the sprayer closer to and farther away from the pack or vice versa. One benefit of varying the distance between the sprayer and the filter media pack is to create the aforedescribed surface roughness. When the sprayer is positioned relatively far from the filter media pack 12, 112, 212, 312, 412, 512, 712, the atomized polymer liquid from the sprayer forms globules before reaching the filter media pack, which stick to the polymer coating 20, 120, 220, 320, 420, 520, 720 already contained on outer surface 14, 114, 214, 314, 414, 514, 714 of the filter media pack 12, 112, 212, 312, 412, 512, 712 or stick to the filter media pack 12, 112, 212, 312, 412, 512, 712 and then are covered with a more uniform layer of the liquid polymer coating 20, 120, 220, 320, 420, 520, 720. Upon curing, the polymer coating 20, 120, 220, 320, 420, 520, 720 is thus provided with a rough surface for improved gripping and aesthetics.

In certain embodiments, the polymeric coating 20 is applied in at least two coats, i.e., the outer surface 14 of the filter media pack 12 is coated a first time with the polymeric coating 20 and then is coated at least a second time with the polymeric coating 20. The material of the polymeric coating 20 can be the same in each coating step, or the material of the polymeric coating can be different in each coating step, such that the polymeric coating 20 is comprised of at least two layers 20*a*, 20*b* as shown representatively in FIG. 3B. While FIG. 3B shows a clean demarcation between layers 20*a*, 20*b*, the actual demarcation between layers may produce a varied or mixed layer region at the interface of the layers 20*a*, 20*b*. Preferably, in embodiments having multiple different layers 20*a*, 20*b*, at least one layer is polyurea. While depicting polymeric coating 20 of the first embodiment of the filter element 10, the multiple layer coating can be applied to the other embodiments of the filter element, including filter elements 100, 200, 300, 400, 500, 700.

Figure 24:
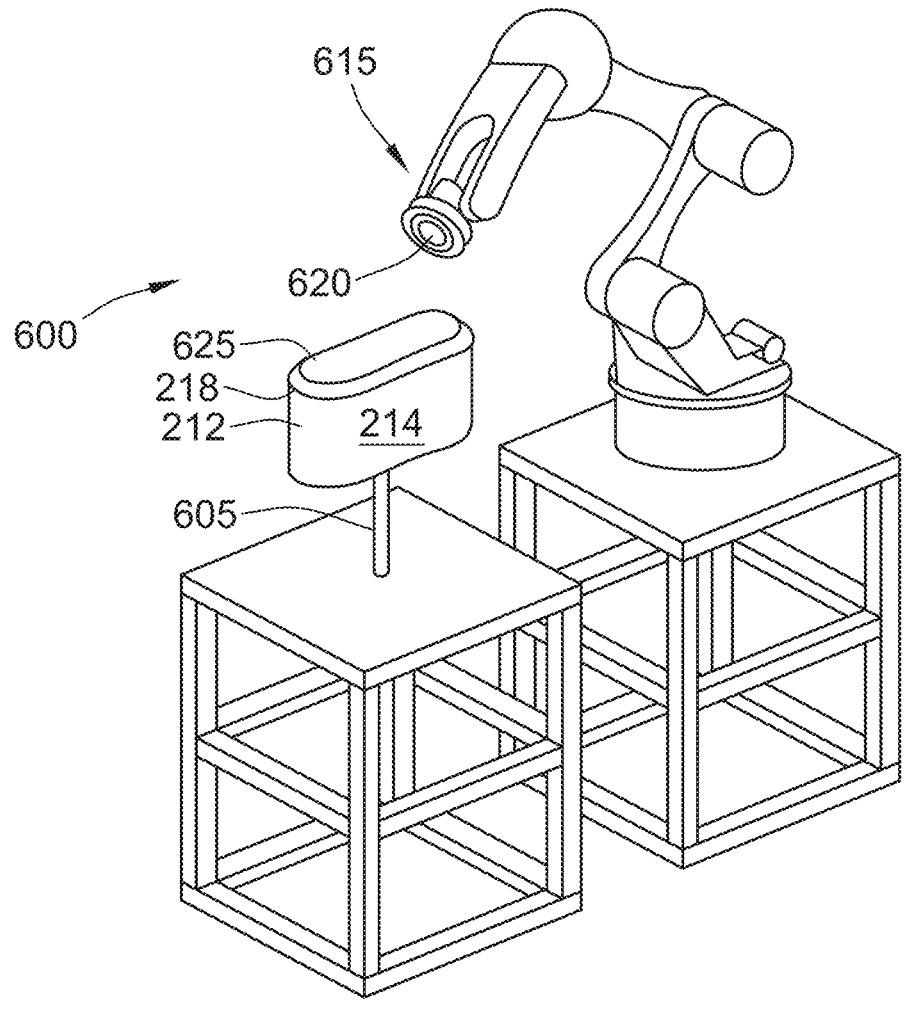
FIGS. 24-25 depict isometric views of an embodiment of a system for applying a polymeric coating to a fluted filter media.
Figure 25:
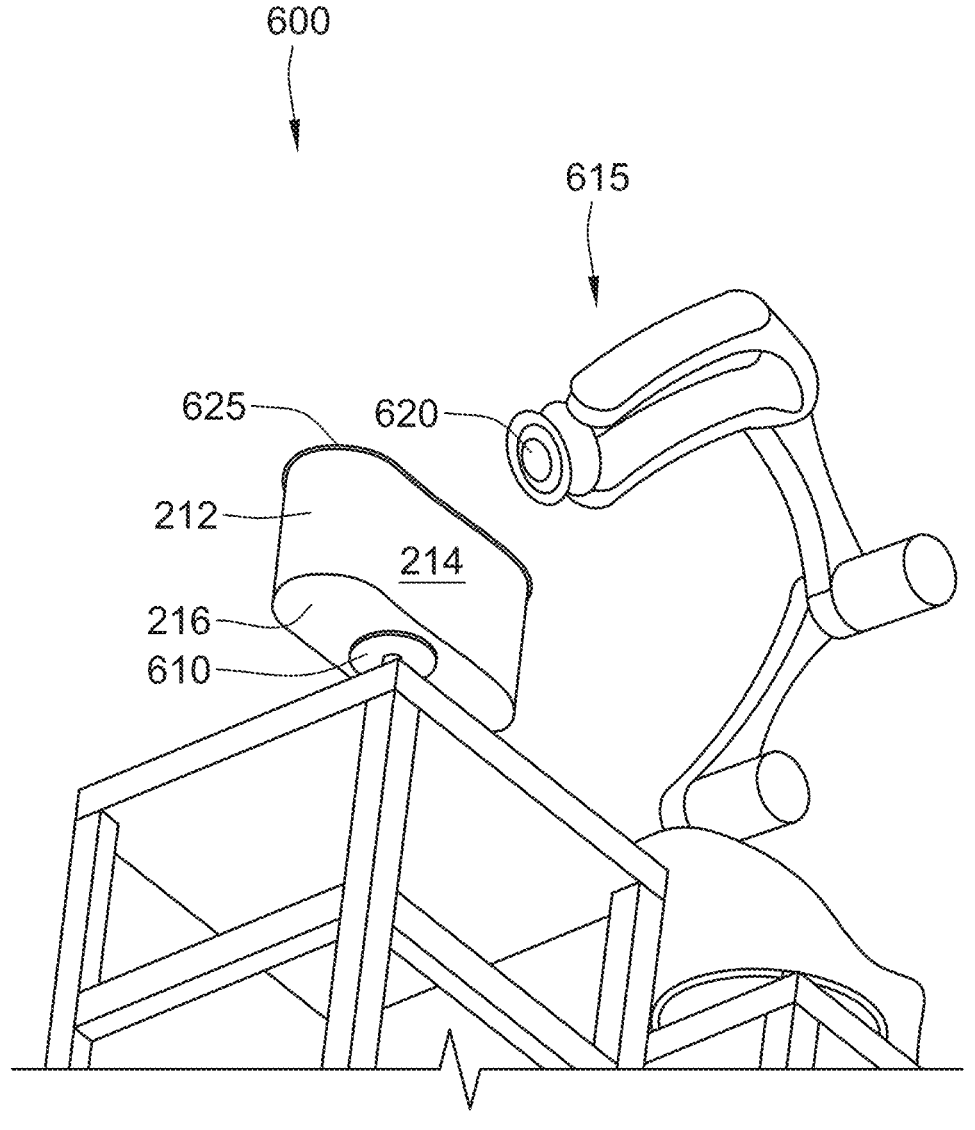

FIGS. 24 and 25 depict, in simplified form, an exemplary system 600 for applying a coating to a filter media pack 212. The system 600 includes a pedestal 605 upon which the filter media pack 212 rests. The pedestal 605 has a base 610 (shown in FIG. 25) of a first area that is equal in size or smaller than the first flow face 216 of a filter media pack 212. The system 600 also includes an applicator 615, such as a sprayer 620. In embodiments using a sprayer 620, the sprayer 620 is angled downward with respect to the pedestal 605 and gravity. The sprayer 620 is also spaced a distance apart from the pedestal 605. The applicator 615, such as a sprayer 620, is configured to apply the polymeric coating 220 to the filter media pack 212. During application, a blocker plate 625 is placed over the second flow face 218 of the filter media pack 212. The blocker plate 625 preferably has a shape and size equal to the area and shape of the second flow face 218 of the filter media pack 212. In this way, the blocker plate 625 prevents liquid polymer from being applied to the second flow face 218 of the filter media pack 212. Additionally, because of the downward angle of the sprayer 620, the first flow face 216 is also not coated with the liquid polymer.

In one embodiment, during application of the polymeric coating 220, the pedestal 605 rotates in front of the applicator 615. In another embodiment, the applicator 615 revolves around the pedestal 605. In still other embodiments, the applicator 615 can revolve around a rotating pedestal 605. In such embodiments, the applicator 615 preferably revolves counter to the direction of rotation of the pedestal 605.

Additionally, in embodiments using a sprayer 620, the distance between the sprayer 620 and the pedestal 605 can vary during application of the polymeric coating 220. In this way, the spray 620 moves closer to and farther away from the pedestal 605. This can be used to form the gripping surface or to more uniformly apply the liquid polymeric coating 220 for non-circular filter media packs.

While the applicator system 600 was described in terms of the filter element 200, the system 600 works as well with the other filter embodiments, including filter elements 10, 100, 300, 400, 500, 700.

For the pleated filter elements (including the embossed and pleated filter elements) 300, 400, 500, preferably the sprayer 620 is angled relative an axis A parallel to the pleat flanks 360, 460, 560 as illustrated in FIGS. 16B, 17, and 21. That is, the sprayer 620 is angled in a plane parallel to the first flow face 316, 416, 516 and second flow face 318, 418, 518. With respect to axis A, preferably the sprayer 620 is oriented at an angle θ of between 105° and 150°. In a more preferred embodiment, the sprayer 620 is oriented at an angle θ of approximately 120°. Thus, the sprayer 620 can be angled relative to the axis A and downward with respect to gravity, or both. This reduces the amount of overspray into the channels formed between adjacent pleat flanks 360, 460, 560. Moreover, if the pleat flanks are sufficiently close together, the polymeric coating can be used to close the channels between adjacent pleat flanks 360, 460, 560 to effectively create an end cap of the filter media pack 312, 412, 512.

Advantageously, the filter media packs 12, 112, 212, 312, 412, 512, 712 featuring the polymeric coating 20, 120, 220, 320, 420, 520, 720 are better able to retain their shape during storage. The polymeric coating 20, 120, 220, 320, 420, 520, 720 restrains the filter media pack 12, 112, 212, 312, 412, 512, 712 from expanding as a result of absorption of ambient moisture and, in the case of wound filter elements, coil stresses. Further, it prevents adjacent layers of filter media from delaminating. The polymeric coating 20, 120, 220, 320, 420, 520, 720 limits expansion in perimeter of the outer surface to less than 5%, when subjected to 100% humidity for a period of 48 hours. In preferred embodiments, the polymeric coating 20, 120, 220, 320, 420, 520, 720 is impermeable to air and moisture such that air and moisture cannot penetrate through the polymeric coating 20, 120, 220, 320, 420, 520, 720 and be absorbed into the filter media pack 12, 112, 212, 312, 412, 512, 712.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element, comprising:

a filter media pack including an outer surface, the outer surface extending between a first flow face and a second flow face;

a polymeric coating applied to the outer surface of the filter media pack, wherein the polymeric coating is not a molded structure; and wherein the polymeric coating comprises a material other than polyurethane, wherein the material is provided with:

(a) a penetration portion penetrating into the outer surface; and (b) an outer layer portion integrally connected to the penetration portion, the outer layer portion extending outwardly from the outer surface of the filter media pack.

2. A filter element, comprising:

a filter media pack including an outer surface, the outer surface extending between a first flow face and a second flow face;

a polymeric coating applied to the outer surface of the filter media pack, wherein the polymeric coating is not a molded structure; and wherein the polymeric coating comprises a polyurea, wherein the polyurea is provided with:

(a) a penetration portion penetrating into the outer surface; and (b) an outer layer portion integrally connected to the penetration portion, the outer layer portion extending outwardly from the outer surface of the filter media pack.

3. The filter element of claim 1, wherein the polymeric coating is selected from the group consisting of acrylic, epoxy, silicone, polyurea, polyaspartic, aliphatic polyurea, polystyrene, polyethylene, ethylene-vinyl acetate, polyethylene-vinyl acetate, ethylene propylene diene monomer, polyurea/polyurethane hybrid, and combinations thereof and wherein the polymeric coating optionally includes fiberglass, roughening agents, or other fillers.

4. The filter element of claim 1, wherein the polymeric coating comprises a spray coating layer.

5. The filter element of claim 1, wherein the polymeric coating has a Shore A Durometer hardness of between about 60 and about 95.

6. The filter element of claim 1, wherein the filter media filter pack is a wound pack having an annular shape, a leading edge of the wound pack being in a radial center of a pack and a trailing edge of the wound pack being along the outer surface forming a step, the polymeric coating filling in and sealing the step and preventing unfiltered fluid flow leakage from the first flow face to the second flow face, without any additional materials applied along the step between the polymeric coating and the filter media filter pack.

7. The filter element of claim 1, wherein the filter media pack is constructed of a filter media and comprises a fluted filter media filter pack comprising a face sheet and a fluted sheet in a wound or stacked configuration for form a plurality of layers such that unfiltered fluid must pass through the face sheet or the fluted sheet to pass from the first flow face to the second flow face.

8. The filter element of claim 1, wherein the polymeric coating has a surface roughness of at least 1,000 μin, and a Shore A Durometer hardness of between about 60 and about 95.

9. The filter element of claim 1, wherein the polymeric coating has a surface roughness of between 5,000 and 9,000 μin.

10. The filter element of claim 1, wherein the polymeric coating is impermeable to air and moisture such that air and moisture cannot penetrate through the polymeric coating.

11. The filter element of claim 1, wherein the polymeric coating is applied to at least 25% of the outer surface extending between the first flow face and the second flow face.

12. The filter element of claim 1, wherein the polymeric coating is applied in at least two coats, with the outer surface of the filter media pack being coated a first time with the polymeric coating and then is coated at least a second time with the polymeric coating.

13. The filter element of claim 2, wherein the polymeric coating comprises a spray coating layer.

14. The filter element of claim 2, wherein the polymeric coating has a Shore A Durometer hardness of between about 60 and about 95.

15. The filter element of claim 2, wherein the filter media filter pack is a wound pack having an annular shape, a leading edge of the wound pack being in a radial center of a pack and a trailing edge of the wound pack being along the outer surface forming a step, the polymeric coating filling in and sealing the step and preventing unfiltered fluid flow leakage from the first flow face to the second flow face, without any additional materials applied along the step between the polymeric coating and the filter media filter pack.

16. The filter element of claim 2, wherein the filter media pack is constructed of a filter media and comprises a fluted filter media filter pack comprising a face sheet and a fluted sheet in a wound or stacked configuration for form a plurality of layers such that unfiltered fluid must pass through the face sheet or the fluted sheet to pass from the first flow face to the second flow face.

17. The filter element of claim 2, wherein the polymeric coating has a surface roughness of at least 1,000 μin, and wherein the polymeric coating has a Shore A Durometer hardness of between about 60 and about 95.

18. The filter element of claim 2, wherein the polymeric coating has a surface roughness of at between 5,000 and 9,000 μin.

19. The filter element as in claim 1, wherein the outer layer portion has an average thickness of between 0.005 and 0.100 inches.

20. The filter element as in claim 1, wherein the outer layer portion has an average thickness between 0.020 and 0.050 inches.

21. The filter element of claim 20, wherein the penetration portion penetrates the filter media pack to a depth of at least 9,000 μin to extend around and interlock with fibers of filter media of the filter media pack.

22. The filter element of claim 1, further comprising a housing gasket formed separately from the polymeric coating, the housing gasket being of a different material than the polymeric coating.

23. The filter element as in claim 2, wherein the outer layer portion has an average thickness of between 0.005 and 0.100 inches.

24. The filter element as in claim 2, wherein the outer layer portion has an average thickness between 0.020 and 0.050 inches.

25. The filter element of claim 24, wherein the penetration portion penetrates the filter media pack to a depth of at least 9,000 μin to extend around and interlock with fibers of filter media of the filter media pack.

26. The filter element of claim 2, further comprising a housing gasket formed separately from the polymeric coating, the housing gasket being of a different material than the polymeric coating.

\* \* \* \* \*